US012551586B2

(12) United States Patent
Johnson

(10) Patent No.: US 12,551,586 B2
(45) Date of Patent: Feb. 17, 2026

(54) METHODS, SYSTEMS, AND APPARATUS FOR STERILIZATION, DISINFECTION, AND PURIFICATION

(71) Applicant: Lawrence Revel Johnson, Leawood, KS (US)

(72) Inventor: Lawrence Revel Johnson, Leawood, KS (US)

(*) Notice: Subject to any disclaimer, the term of this patent is extended or adjusted under 35 U.S.C. 154(b) by 904 days.

(21) Appl. No.: 17/850,408

(22) Filed: Jun. 27, 2022

(65) Prior Publication Data

US 2023/0414798 A1 Dec. 28, 2023

(51) Int. Cl.
*A61L 2/00* (2006.01)

(52) U.S. Cl.
CPC ........... *A61L 2/0076* (2013.01); *A61L 2/0047* (2013.01); *A61L 2/0088* (2013.01); *A61L 2202/22* (2013.01)

(58) Field of Classification Search
CPC .... A61L 2/0076; A61L 2/0047; A61L 2/0088; A61L 2202/22; A61L 2209/11; A61L 2209/111; A61L 2209/16; A61L 9/015; A61L 9/02; A61L 9/205; A61L 9/14
See application file for complete search history.

(56) References Cited

U.S. PATENT DOCUMENTS

| | | |
|---|---|---|
| 7,094,378 B1 | 8/2006 | Goodrich, Jr. et al. |
| 10,940,260 B2 | 3/2021 | Igarashi |
| 11,147,876 B2 | 10/2021 | Sowemimo-Coker |
| 2003/0214874 A1* | 11/2003 | Hlavinka ............... B01F 33/055 366/214 |
| 2003/0215784 A1* | 11/2003 | Dumont ................ A61K 41/17 435/2 |
| 2010/0057060 A1 | 3/2010 | Herekar |

(Continued)

FOREIGN PATENT DOCUMENTS

| | | |
|---|---|---|
| CN | 204521168 U | 8/2015 |
| CN | 104758119 B | 10/2017 |

(Continued)

OTHER PUBLICATIONS

Damen et al., "Effect of Ultra-High Temperature Steam Injection Processing and Aseptic Storage on Labile Water-Soluble Vitamins in Milk," Journal of Diary Science, vol. 72, No. 3, 1989.

(Continued)

*Primary Examiner* — Brendan A Hensel

(57) ABSTRACT

In one illustrative example, a method for use in sterilization involves carrying a liquid or a flow of liquid comprising water; converting the liquid or the flow thereof into mist or steam; adding riboflavin in soluble form as a photosensitizer to the liquid or the flow thereof, converting the liquid or the flow thereof into mist or steam that carries the riboflavin; discharging the mist or the steam that carries the riboflavin into a chamber, a container, or a room; and emitting, on the mist or the steam that carries the riboflavin, a riboflavin-activating light sufficient to activate the riboflavin to enhance a cross-linking of genetic material including the amino acids of proteins of cells or pathogens or extracellular genetic material in the chamber, the container, or the room. Additional processing steps may be employed for disrupting barriers, for increased access of the riboflavin and light to the genetic material.

20 Claims, 16 Drawing Sheets

(56) References Cited

U.S. PATENT DOCUMENTS

| | | | |
|---|---|---|---|
| 2011/0210268 A1 | 9/2011 | Dornseifer | |
| 2012/0118150 A1 | 5/2012 | Brizes et al. | |
| 2015/0307368 A1 | 10/2015 | Yanke | |
| 2016/0088853 A1 | 3/2016 | Tikekar et al. | |
| 2016/0206768 A1 | 7/2016 | Mullins | |
| 2018/0055960 A1 | 3/2018 | Reiber et al. | |
| 2018/0338905 A1 | 11/2018 | Shapiro et al. | |
| 2020/0030469 A1 | 1/2020 | Neister et al. | |
| 2020/0030790 A1* | 1/2020 | Dodd | A61M 1/0209 |
| 2021/0346531 A1* | 11/2021 | Kim | A61L 2/0052 |
| 2022/0143243 A1* | 5/2022 | Chen | A61L 2/18 |

FOREIGN PATENT DOCUMENTS

| | | |
|---|---|---|
| CN | 109908376 B | 8/2021 |
| EP | 1469891 B1 | 7/2003 |
| KR | 20150032044 A | 3/2015 |
| WO | 03066109 A1 | 8/2003 |
| WO | 2021072927 A1 | 4/2021 |

OTHER PUBLICATIONS

Alotaibi et al., "Solar Disinfection of Water for Inactivation of Enteric Viruses and its Enhancement by Riboflavin," Food and Environmental Virology, Article No. 70, May 27, 2011.

Beggs et al., "Upper-room ultraviolet air disinfection might help to reduce COVID-19 transmission in buildings," PeerJ doi: 10.7717/peerj.10196, Jun. 16, 2020.

Hadi et al., "Control Measures for SARS-CoV-2: A Review on Light-Based Inactivation of Single-Stranded RNA Viruses," Pathogens 2020; Sep. 8, 2020.

Martins et al., "Antimicrobial Efficacy of Riboflavin/UVA Combination (365 nm) In Vitro for Bacterial and Fungal Isolates: A Potential New Treatment for Infectious Keratitis," Investigative Ophthalmology & Visual Science, Aug. 2008, vol. 49, No. 8.

Shen et al., "Effect of Ultraviolet Light Irradiation Combined with Riboflavin on Different Bacterial Pathogens from Ocular Surface Infection," Journal of Biophysics, vol. 2017, Article ID 3057329.

Xu et al., "Vitamin K5 is an efficient photosensitizer for ultraviolet A light inactivation of bacteria," FEMS Microbiology Letters, 365, Jan. 15, 2018.

Gambro Press Release, "Gambro awarded US patent for its unique process of inactivation of pathogens in blood components," Jul. 27, 2001.

Ragan et al., "Pathogen Reduction of SARS-CoV-2 Virus in Plasma and Whole Blood Using Riboflavin and UV Light," Department of Biomedical Sciences, Infectious Disease Research Center, Translational Medicine Institute, May 4, 2020.

Sadraeian et al., "Study of Viral Photoinactivation by UV-C Light and Phtosensitizer Using a Pseudotyped Model," Pharmaceutics 2022, Mar. 21, 2022.

Sangsom et al., "Design and Development of Innovative Steam Injection for High-Temperature Short-Time Liquid Foods," Processes 2022, Jan. 14, 2022.

ShineLong Technology Corp., Ltd., "An A-to-Z Guide on What There is to Know About UVC LED Lights," https://www.shinelongled.com/uvc-led-light/, downloaded Nov. 21, 2021, 23 pages.

Waveform Lighting LLC, "An Introduction to UV-C LED Lighting for Germicidal, Sterilization and Disinfection Applications," https://www.waveformlighting.com/uv-c-led/uv-c-led-lighting-for-germicidal-sterilization-and-disinfection-applications, downloaded Nov. 21, 2021, 7 pages.

International Light Technologies Inc., "UV-C LEDs for UVGI / Disinfection," https://www.intl-lighttech.com/applications/uvc-leds, downloaded Nov. 21, 2021, 6 pages.

\* cited by examiner

METHODS, SYSTEMS, AND APPARATUS FOR STERILIZATION, DISINFECTION, AND PURIFICATION

TECHNICAL FIELD

The present disclosure generally relates to methods, systems, and apparatus for sterilization, disinfection, and/or purification, and more particularly to methods, systems, and apparatus for sterilization, disinfection, and/or purification with use of ultraviolet C (UV-C) light emission and riboflavin as a photosensitizer which may be carried by water, mist, or steam.

BACKGROUND

Pathogen reduction using riboflavin and ultraviolet (UV) light is a method by which infectious pathogens in blood for transfusion are inactivated by adding riboflavin and irradiating with UV light. This method reduces infectious levels of disease-causing agents found in donated blood components while still maintaining good quality blood components for transfusion. This type of approach for increasing blood safety is known as "pathogen inactivation" in the industry.

Pathogen inactivation prevents viruses, bacteria, parasites, fungi, mycobacteria, prions, other proteins, and white blood cells from replicating and causing disease. In this approach, exposure to UV light activates the riboflavin and, when associated with nucleic acids such as Deoxyribonucleic acid (DNA) and Ribonucleic acid (RNA) as well as the amino acids found in proteins, collectively referred to as genetic material, causes a chemical alteration to functional groups of the nucleic acids and of the amino acids, thereby making the pathogens unable to replicate and/or function. The UV light also damages any protein structures, including the enhancing of cross-linking of amino acids found within proteins.

Applications for UV disinfection are known but they often use mercury-based UV lamps which have some disadvantages. For one, there is increased regulation around mercury usage and its environmental impact, resulting in increased disposal costs and proposed bans in some countries. In addition, the UV lamps require the use of chlorine to enable disinfection and are typically relatively large.

There is a need to provide methods, systems, and apparatus for sterilization, disinfection, and purification that may be more broadly applied and utilized in a number of different applications, and/or to provide for safe use after sterilization, disinfection, or purification.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

Overview

Figure 1A:
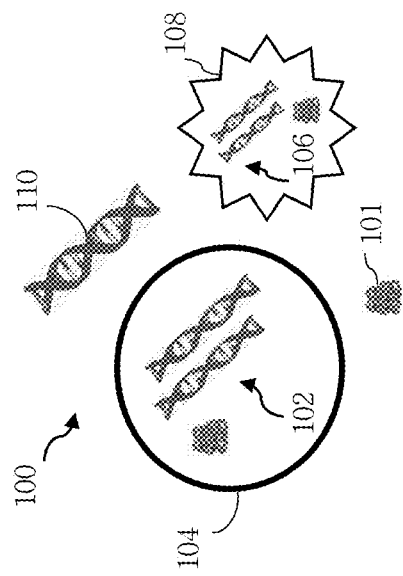
FIG. 1A is an illustrative representation of examples of infectious agents which include genetic material of a cell, genetic material of a pathogen, and extracellular genetic material.

According to some implementations of the present disclosure, what are provided are methods, systems, and apparatus for sterilization, disinfection, and/or purification with use of ultraviolet C (UV-C) light emission and riboflavin as a photosensitizer which may be carried by water, mist, or steam.

In one illustrative example, a method for use in sterilization or purification of mist, steam, or air may involve carrying a liquid or a flow of liquid comprising water; adding riboflavin in soluble form as a photosensitizer to the liquid or the flow thereof; converting the liquid or the flow thereof into mist or steam that carries the riboflavin and releasing it into air; emitting, on the mist or the steam that carries the riboflavin within the air, a riboflavin-activating light sufficient to activate the riboflavin to enhance a cross-linking of genetic material of cells or pathogens or extracellular genetic material within the air, for sterilization of the genetic material of the cells or the pathogens or the extracellular genetic material within the air, for thereby producing sterilized air which is released or circulated in a chamber, a container, or a room. In some implementations, at least some of the steps of the method are repeated in an ongoing process for producing sterilized air which is recirculated through the chamber, the container, or the room.

In a specific variation or implementation of the above, a method for use in sterilizing circulating air may involve carrying a liquid or a flow of liquid comprising water; adding riboflavin in soluble form as a photosensitizer to the liquid or the flow thereof; converting the liquid or the flow thereof into mist or steam that carries the riboflavin; allowing the mist or the steam that carries the riboflavin to be released into circulating air that is being circulated; emitting, on the mist or the steam that carries the riboflavin within the circulating air, a riboflavin-activating light sufficient to activate the riboflavin to enhance a cross-linking of genetic material of cells or pathogens or extracellular genetic material within the circulating air that is being circulated, for sterilization of the genetic material of the cells or the pathogens or the extracellular genetic material; and repeating the adding, the converting, the discharging, and the emitting as necessary for producing sterilized circulating air that flows through the chamber, the container, or the room.

In another illustrative example, a method for use in sterilization may involve carrying a liquid or a flow of liquid comprising water; converting the liquid or the flow thereof into mist or steam; adding riboflavin in soluble form as a photosensitizer to the liquid or the flow thereof, converting the liquid or the flow thereof into mist or steam that carries the riboflavin; discharging the mist or the steam that carries the riboflavin into a chamber, a container, or a room; and emitting, on the mist or the steam that carries the riboflavin, a riboflavin-activating light sufficient to activate the riboflavin to enhance a cross-linking of genetic material of cells or pathogens or extracellular genetic material in the chamber, the container, or the room, for sterilization of the genetic material of the cells or the pathogens or the extracellular genetic material in the chamber, the container, or the room.

In yet another illustrative example, a method for use in disinfecting a liquid may involve adding riboflavin as a photosensitizer in the liquid or a flow of liquid; and emitting a riboflavin-activating light on the liquid or the flow thereof that carries the riboflavin, sufficient to activate the riboflavin to enhance a cross-linking of genetic material of cells or pathogens or extracellular genetic material in the liquid, for sterilization of the genetic material of the cells or the pathogens or the extracellular genetic material in the liquid. In some implementations, the liquid may be water and the method is for use in water sterilization. In other implementations, the liquid may be a liquid pharmaceutical or an intravenous fluid, the adding of the riboflavin may involve adding the riboflavin in soluble form to the liquid pharmaceutical or the intravenous fluid, and the emitting of the riboflavin-activating light may be performed before or after a packaging of the liquid pharmaceutical in a pharmaceutical packaging or the intravenous fluid in an intravenous fluid packaging. In yet other implementations, the liquid may be converted into mist or steam prior to adding the riboflavin in soluble form as a mist or steam, and the mist or the steam that carries the riboflavin may subsequently be converted back (e.g., via condensing) into the liquid that carries the riboflavin prior to emitting the riboflavin-activating light.

In some implementations of the various above-described methods, the riboflavin-activating light may be UV-C radiation or light from one or more UV-C light-emitting diodes (LEDs). In some implementations, the above-described methods may further involve generating high-frequency sound or vibrational waves (e.g., ultrasonic waves) through the liquid, mist, or the steam that carries the riboflavin, sufficient to disrupt barriers of the cells or the pathogens (or surface films), for increased access of the riboflavin and the UV-C to the genetic material of the cells or the pathogens for increased sterilization. In some additional or alternative implementations, the above-described methods may further involve exerting and maintaining increased pressure (e.g., increased hydrostatic or barometric pressure) on the liquid, mist, or the steam that carries the riboflavin, sufficient to disrupt barriers of the cells or the pathogens (or surface films), for increased access of the riboflavin and the UV-C to the genetic material of the cells or the pathogens for increased sterilization. In some additional or alternative implementations, the above-described methods may further involve heating the liquid or the flow thereof that carries the riboflavin (and/or the air), sufficient to disrupt barriers of the cells or the pathogens (or surface films), for increased access of the riboflavin and the UV-C to the genetic material of the cells or the pathogens for increased sterilization. In other implementations, the above-described methods may further involve a multimodal approach for the disruption of barriers of the cells or the pathogens (or surface films).

More detailed and alternative methods and implementations are provided herein as described below, including their associated systems and apparatus.

EXAMPLE EMBODIMENTS

What are described herein are methods, systems, and apparatus for sterilization, disinfection, and/or purification with use of Ultraviolet C (UV-C) radiation or light emission and riboflavin as a photosensitizer which is carried by water, mist, or steam according to at least some implementations of the present disclosure.

The methods, systems, and apparatus of the present disclosure may be utilized for sterilization of air, water, medical, laboratory, and related instruments, masks and respirators, rooms including surgical suites and the like, liquid pharmaceuticals, and intravenous fluids like sterile saline and lactated ringers' solution among others, and other medically related fluids, as well as in humidifiers, air purifiers, heating, ventilation and air condition (HVAC) systems, and more. For implementation of the methods, systems, and apparatus of the present disclosure, existing base technologies may be utilized, including components and techniques of steam humidifiers, mist nozzles, light emitters, sound emitters, pressure chambers, dehumidifiers, and even chemical dispensers such as for chlorine in pools, and the like.

In preferred implementations, UV-C light emission is utilized for sterilization, disinfection, and/or purification. UV-C is ultraviolet light having a wavelength between 200 and 290 nanometers (nm). In preferred implementations, UV-C light from one or more UV-C light-emitting diodes (LEDs) may be utilized. Over the LED UV-C range, a detrimental effect on microbial cells occurs because the intercellular components of microbes (e.g., Deoxyribonucleic acid (DNA), Ribonucleic acid (RNA), and proteins) can sensitively absorb LED UV-C photons. Absorbed LED UV-C photons cause critical damage to the genomic system of cells and microorganisms (e.g., nucleic acids and proteins), preventing them from replicating and surviving.

The inherent sensitivity of cellular and microbial DNA/RNA and proteins may depend on the wavelength of incident LED UV-C photons. LED UV-C light may disrupt barriers, damage DNA and RNA directly, as well as activate or enhance the cross-linking effect of the photosensitizer (e.g., riboflavin). The source of light, the wavelength of light, whether the light is emitted at a constant rate or in a pulsed fashion, and the dose of energy transferred or the duration of exposure may vary depending upon the use case. In some implementations, reflective surfaces may be used to enhance exposure to the UV-C light.

Applications for UV-C disinfection are known but they often use mercury-based UV lamps which have disadvantages. For one, there is increased regulation around mercury usage and its environmental impact, resulting in increased disposal costs and proposed bans in some countries. In addition, the UV lamps require the use of chlorine to enable disinfection and are typically relatively large. Unlike mercury-based UV-C light sources (e.g., compact fluorescent light (CRL) bulbs and others), an LED enables a more focused application without the problem of dispersion and less environmental issues. As a solid-state device, UV-C LEDs may be cycled on/off a large number of times (e.g., tens of thousands of times) with little or no observable difference or degradation in performance. UV-C LEDs also offer a near-instant capability to provide full-rated output, requiring little or no warmup time. Such capabilities mean that the LEDs may be employed in an on-demand fashion, accumulating operating hours only when "on" and providing their disinfection function without penalty. In most or all scenarios using LED UV-C light or other light sources, consideration should be given to the production of ozone and its removal using standard commercially available means.

In preferred implementations, riboflavin is used as a photosensitizer together with the emission of the UV-C light. A photosensitizer may be characterized as a molecule that absorbs light (i.e., photon energy or "hv") and transfers its energy to another nearby molecule. Activation of riboflavin with use of an UV-C light source will enhance the cross-linking of DNA and RNA of cells or pathogens or even extracellular DNA and RNA.

Riboflavin, also known as vitamin $B_2$, is a vitamin found in food and used as a dietary supplement. It is required by the body for cellular respiration. Food sources include eggs, green vegetables, milk and other dairy products, meat, mushrooms, and almonds. Some countries require its addition to grains. Riboflavin is very thermally (heat) stable and very difficult to overdose on as a vitamin. Riboflavin is a naturally occurring vitamin with no reported cases of human toxicity, and any excess can be excreted by the kidneys. Because of its light sensitivity, riboflavin may be stored in a dark environment until it is ready to be used.

Again, activation of riboflavin with use of an UV-C light source will enhance the cross-linking of DNA and RNA of cells or pathogens, extracellular DNA and RNA, as well as amino acids found in proteins. Such cross-linking prevents cells or pathogens from reproducing, thereby causing their death, and destroys or renders functionless proteins. Here, the protein structure of the protein may even be altered, which can alter whether or not the protein can carry out its intended function. Note that familiar pathogens include viruses, bacteria, fungi, mycobacteria, prions, and proteins, which are the final product of DNA and RNA, as only a few examples. As a few examples, viruses may cause diseases ranging from acquired immunodeficiency syndrome (AIDs) and smallpox to the common cold; they are essentially fragments of nucleic acid, DNA and/or RNA, wrapped up in a protective shell of proteins and, in some cases, a membrane. *Mycobacterium tuberculosis* is the etiological agent of tuberculosis (TB), a contagious infection that usually attacks the lungs. Prions may be found in Creutzfeldt-Jakob Disease (CJD) (a.k.a. subacute spongiform encephalopathy or neurocognitive disorder due to prion disease) and Kuru Disease, amongst others.

In some preferred implementations, water, mist, or steam may be the carrier of the riboflavin in which it is dissolved or solubilized. Here, the riboflavin may be dissolved in water and solubilized and/or provided in mist or steam form. Exposing the water, mist, or steam that carries the solubilized riboflavin to the UV-C light (or transporting/spraying and subsequently exposing) causes activation of riboflavin and the enhanced cross-linking of DNA and RNA, including the amino acids found in proteins.

To illustrate by example, riboflavin may be dissolved in water and solubilized at 10-13 milligrams (mg) of riboflavin per 100 milliliter (mL) of water at ambient room temperature (where ambient or room temperature may be defined as 68-77° Fahrenheit (F) or 20-25° Celsius (C)). In steam form, one may solubilize 19 mg of riboflavin in 100 mL of steamed water (e.g., where steam may be defined as 100° F. or 37.8° C.). The desired final concentration of riboflavin may range from 50 parts per million to 500 parts per million; this may vary, at least in part, on the use case and the configuration of other forms that enhance riboflavin uptake and/or DNA and RNA disruption, such as hydrostatic or barometric pressure and sound or vibrational waves. Steam, defined as 100° F. or 37.8° C., adds to the sterilization process, as many pathogens and cells cannot survive at that high of a temperature.

To further illustrate by example, an LED UV-C having a wavelength of 260 nm may be applied with an energy density of 0.32 Joule (J) per squared centimeter ($cm^2$) ($J/cm^2$) for one (1) hour. As another illustrative example, an LED UV-C having at a wavelength of 254 nm may be applied with an energy density of 1.45 $J/cm^2$ for six (6) minutes. As yet another illustrative example, an LED UV-C having a wavelength of 280 nm may be applied with an energy density of 84 millijoule (mJ) per $cm^2$ ($mJ/cm^2$) for 20 seconds. In some implementations, another type of riboflavin-activating light having a different wavelength, dose of energy, etc., may be utilized. For example, blue light having a wavelength of 405 nm may be applied with an energy density of 2804 $J/cm^2$. As another example, such blue light having a wavelength of 470 nm may be applied with an energy density of 3.6 $J/cm^2$ for 60 seconds. Note that the various sources of energy for activating riboflavin may be emitted continuously, in a pulsed fashion, and/or in some other non-continuous fashion. Such energy may directly destroy genetic material and sterilize on its own depending upon the energy dosage, duration of exposure, and/or form of energy.

In some implementations, riboflavin may be replenished in an ongoing fashion, as the photosensitizer is taken up by the cell or pathogen naturally and/or under the influence of LED UV-C or other suitable light. The adding of riboflavin to a liquid or flow thereof may involve regularly or continuously injecting riboflavin in soluble form into regularly or continuously replenished liquid or flow thereof. Note that a photosensitizer may behave much like an antibiotic that is taken up by the cell or pathogen (ideally) naturally. Antibiotics that are administered in several different fractionated doses (e.g., versus a single large dose) are more effective at killing pathogens.

Using such a multiple-dose approach, the LED UV-C light or other light source may cause activation of the riboflavin to enhance a cross-linking of DNA and RNA as well as the amino acids found in proteins (e.g., prions, which are reproducible), to thereby inactivate and eventual kill the pathogen and/or cell as it can no longer reproduce. Multiple rounds of disinfection may be necessary in order to destroy all of the cells or pathogens. On the other hand, for drinking water or other beverage, or for a liquid pharmaceutical or an intravenous fluid, only a fixed amount of riboflavin may be needed (despite their being no reported cases of riboflavin toxicity).

In order to better utilize riboflavin to enhance the cross-linking of DNA and RNA as well as the amino acids found in proteins, the riboflavin must be able to enter the cell or pathogen, regardless of the properties of the cell or pathogen (e.g., whether an enveloped virus, a non-enveloped virus, or other, etc.). In some implementations, the cell or pathogen may naturally take up the riboflavin. In further implementations, additional techniques may be utilized in order to better enable the riboflavin to gain access to the cell or pathogen. Additional techniques to better enable the riboflavin and the associated UV-C to gain access to the cell or pathogen may include generating high-frequency sound or vibrational waves (e.g., performing ultrasonication) and/or increasing pressure (e.g., increasing hydrostatic or barometric pressure). Steam, defined as 100° F. or 37.8° C., may also cause disruption of barriers as well as sterilization. Note that even LED UV-C radiation has only a superficial effect that does not normally penetrate barriers without assistance in gaining underlying access. Hence, the disinfection obtained may be limited to only surfaces and not the internal structures until access is gained by both the riboflavin and the UV-C.

Surface films and/or other obstructions are therefore thoughtfully considered. For example, a biofilm is a collection of one or more types of microorganisms (e.g., bacteria, fungi, and other pathogens) that may grow on a variety of different surfaces. Biofilms are often associated with a hot tub or a bath having water jets. As a specific example, the biofilm may be a community of bacteria that is attached to a surface by the excretion of a sticky, sugary substance that encompasses the bacteria in a matrix. Note that the formation of such complex biofilm-like assemblies, such as bacteria and viruses, appears to be a major mechanism of propagation for certain pathogens. These extracellular infectious structures may protect pathogens from the LED UV-C radiation or from some other light source and enable them to spread efficiently. Hence, the emitted LED UV-C dose or dose from some other light source from the disinfector may not necessarily be the same as the actual dose that the treated pathogen receives without help.

As a real example of how effective biofilms are at preventing sterilization, consider bathtubs and hot tubs having water jets. Such tubs require that the water be removed through pipes, subject to increased hydrostatic pressure, and then returned over and over again. What many do not realize is that the piping outside of the tub is often coated with a biofilm. Using bleach, ammonia, and standard detergents is often ineffective at cleaning these surfaces. Thus, people who use these tubs often get cutaneous inflammation, dermatitis, and urinary tract infections.

Accordingly, in some implementations, several different methods may be employed for disruption of these and other barriers. This multimodal approach is more effective in sterilization, given that there is some variation in how effective certain methods are against specific pathogens, in not only in killing them, but also in gaining access to them through barriers, such as biofilms, amongst others. By taking such an approach, one may more effectively kill the "unknown." Additional rounds of sterilization may be utilized as described herein to kill underlying pathogens (after killing the "surface pathogens") that might be shielded by films or obstructions such as biofilms.

Thus, additional methods may be utilized to increase the uptake of riboflavin, such as the generation of high-frequency sound or vibrational waves (e.g., performing ultrasonication) and/or the exertion of increased pressure, such as hydrostatic pressure or barometric pressure. Sound or vibrational waves may also cause fragmentation of DNA, RNA, and proteins. Steam has a sterilizing effect as well as an ability to remove barriers to entry of riboflavin. The methods that allow for riboflavin entry into the cell or pathogen may be used alone or in combination with one or more others.

In some implementations, high-intensity, focused ultrasonic waves may be generated in order to disrupt barriers such as capsids, envelopes, cell walls, surrounding proteins, lipids, or other surrounding materials in cells, viruses, bacteria, fungi, and mycobacteria and to fragment DNA and RNA as well as proteins. In general, sonication transforms electrical energy into ultrasonic energy. In one example, the ultrasonic waves may be produced with use of an electrical signal generator which sends a burst of electrical energy to a piezoelectric crystal in a transducer, thereby causing the crystal to vibrate and convert the electrical pulses into mechanical vibrations (sound or vibrational waves). The sound or vibrational waves create alternating compression and expansion cycles, with rates depending upon the frequency of the sound or vibrational waves. During a low pressure cycle, high intensity ultrasonic waves create small vacuum bubbles. When the bubbles can no longer absorb the energy, they violently collapse during a high-pressure cycle termed cavitation resulting in DNA, RNA, chromatin, and proteins being fragmented. This may be done via a focused beam of energy of variable frequency in the range of 100 kilohertz to 10 megahertz, and the location of the sound emitter, duration of treatment, number of cycles, and periods of quiet will vary depending upon the need. Interference may be minimized using a standard feedback-based sensor to minimize reflection or spatial separation among others.

Ultrasonication may be characterized by irradiation of a liquid sample with ultrasonic (e.g., greater than 20 kilohertz (kHz)) waves to result in agitation. A high-intensity, focused ultrasonic may be utilized in order to disrupt barriers, which may include cellular and bacterial walls as well as viral envelopes, and to fragment DNA and RNA as well as proteins. As one illustrative example, this may be done via a focused beam of energy of variable frequency in the range of 100 kHz to 10 megahertz (MHz). The duration of treatment, number of cycles, and periods of quiet may vary depending upon the need. Interference may be minimized using a standard feedback-based sensor to minimize reflection or spatial separation among others. The variables that will affect the combination used will include the volume of water or steam to expose the energy to as well as the depth of penetration required.

Note that such high frequency sound waves by themselves may be sufficient to disrupt genetic material, which may depend on the frequency, duration of exposure, and/or dosage. Even by themselves, such high frequency sound waves may be sufficient to sterilize, and this may depend on the frequency, duration of exposure, and/or dosage. Some forms of energy (including light), even by themselves, may activate riboflavin and enhance its cross-linking of genetic material, and again this may depend on the frequency, duration of exposure, and/or dosage.

In some implementations, when water, mist, or steam is used as the carrier of the riboflavin in which it is dissolved or solubilized, an increased pressure or hydrostatic pressure or barometric pressure be exerted and maintained. As the carrier, the water, mist, or steam may be utilized to increase the hydrostatic pressure or even as the milieu by which ultrasonication may be performed. Exposing the water or steam with the solubilized riboflavin, and increasing hydrostatic pressure, together with exposure to the LED UV-C or other light form, may cause activation of riboflavin and enhanced DNA and RNA cross-linking as well as the cross-linking of amino acids found in proteins. To illustrate by example, hydrostatic pressure or barometric pressure may be increased in a pressure chamber to enhance killing by disrupting barriers such as capsids, envelopes, cell walls, surrounding proteins, lipids, or other surrounding materials in cells, viruses, bacteria, fungi, mycobacteria, and proteins.

For example, the hydrostatic pressure may be increased to a High Hydrostatic Pressure (HHP) of 500 MPa for a minimum of 5 minutes.

Note that such exertion of pressure by itself may be sufficient to disrupt genetic material, and this may depend on the level and the duration of the exertion. Even by itself, such exertion of pressure may be sufficient to sterilize genetic material and sterilize on its own. Such exertion of pressure by itself serves as a means of increasing the temperature which may be sufficient to disrupt genetic material and barriers.

Thus, exposing the water or steam with the solubilized riboflavin, and performing ultrasonication and/or increasing the hydrostatic pressure or barometric pressure, together with exposure to the LED UV-C or other light form, may cause activation of riboflavin and enhanced DNA and RNA cross-linking as well as amino acid cross-linking in proteins. The variables that will affect the combination and specific configurations of light source, hydrostatic pressure, barometric pressure, and sound or vibrational waves used will include the use case, the question of what needs to be penetrated and affected, the volume of water or steam to expose the LED UV-C light or other source, the volume involved, and the depth of penetration required.

Thus, techniques and mechanisms for sterilization according to some implementations of the present disclosure may involve the use of UV-C light (e.g., emitted by one or more UV-C LEDs) and riboflavin as a cross-linking agent for either DNA or RNA in cells or pathogens, and the amino acids in proteins, where water, mist, or steam is used as a matrix. More specifically, aerosolized or steamed (100° F. by definition) riboflavin may be used the cross-linking agent for DNA and RNA in conjunction with UV-C light emitted by one or more UV-C LEDs.

To better illustrate in relation to the figures, FIG. 1A is an illustrative representation of examples of infectious agents 100 which include genetic material 102 of a cell 104, genetic material 106 of a pathogen 108 (e.g., bacteria, fungus, virus, mycobacteria, proteins, etc.), and extracellular genetic material 110. The genetic material as described herein may also include, as illustrated in FIG. 1A, other related material such as a folded protein 101.

Figure 1B:
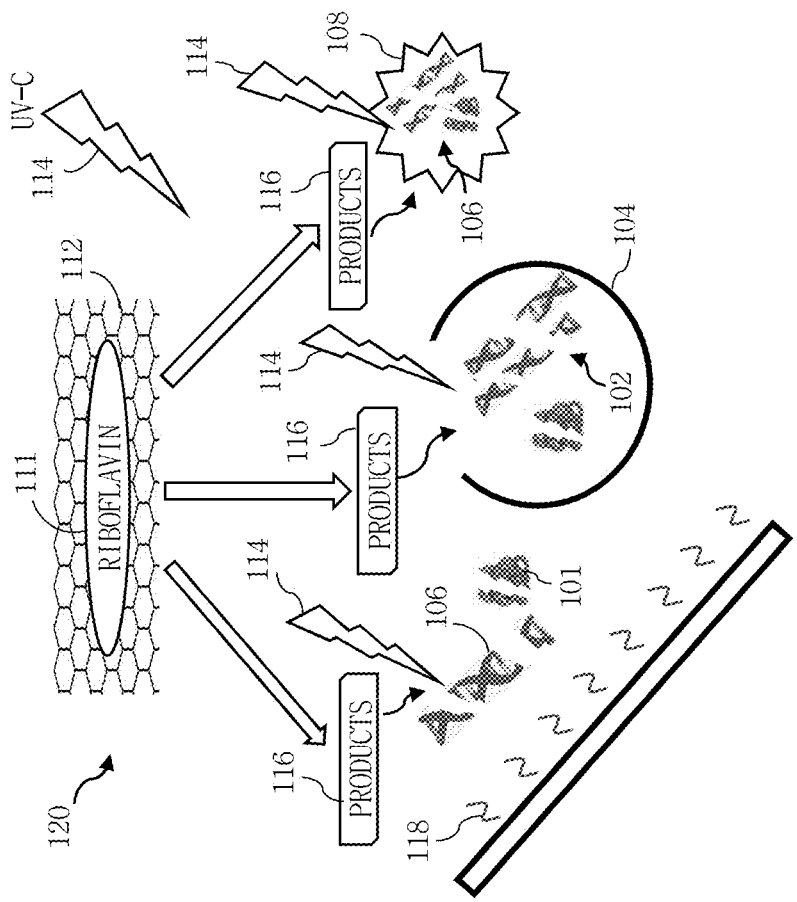
FIG. 1B is an illustrative depiction of a basic process for sterilization of such infectious agents according to some implementations of the present disclosure.

FIG. 1B is an illustrative depiction of a basic process 120 for sterilization of such infectious agents of FIG. 1A according to some implementations of the present disclosure. In basic process 120 of FIG. 1B, riboflavin 111 which is carried in a matrix 112 of water, mist, or steam is exposed to a riboflavin-activating light 114. When riboflavin 112 is in close proximity to or in contact with the genetic material, the exposure of the riboflavin-activating light 114 is sufficient to activate riboflavin 112 (e.g., releasing products 116) for enhancing a cross-linking of the genetic material. In some implementations, riboflavin-activating light 114 may be UV-C light which may be produced by one or more UV-C LEDs. With use of basic process 120, genetic material 102 of cell 104, genetic material 106 of pathogen 108, extracellular genetic material 110, and/or amino acids of proteins 101 may be damaged and/or sterilized as illustrated. As used herein, "genetic material" may include one or more of DNA, RNA, and/or the amino acids found in proteins.

During at least part of basic process 120, membrane disruptive waves 118 may be generated, exerted, and/or maintained in order to damage or disrupt barriers of cell 104 or pathogen 108. In some implementations, membrane disruptive waves 118 are high-frequency sound or vibrational waves (e.g., ultrasonic waves), or alternatively, increased pressure waves of an increased pressure (e.g., increased hydrostatic pressure or barometric pressure) that is exerted and maintained during basic process 120. The damage or disruption of barriers of cell 104 or pathogen 108 (by membrane disruptive waves 118, and/or by riboflavin-activating light 114 itself, and/or by heating water into steam or otherwise, etc.) increases the riboflavin's 111 access to genetic material 102 of cell 104 and/or genetic material 106 of pathogen 108, for increased sterilization of the same.

Figure 2A:
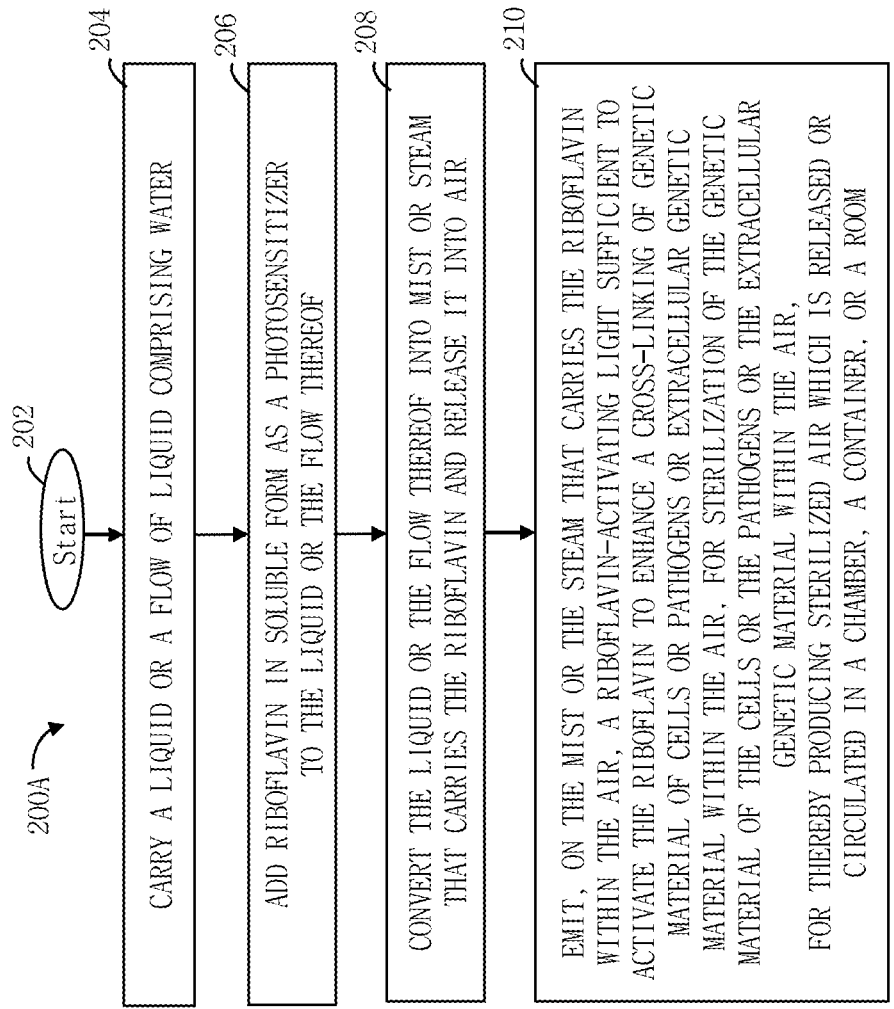
FIG. 2A is a flowchart for describing a method for use in sterilization or purification of mist, steam, or air according to some implementations of the present disclosure.

FIG. 2A is a flowchart 200A for describing a method for use in sterilization or purification of mist, steam, or air according to some implementations of the present disclosure. Beginning a start block 202 of FIG. 2A, a liquid or a flow of liquid comprising water may be carried, for example, in a holding container, a holding chamber, or a holding tank, or through a channel, a tube, or a pipe, etc. (step 204 of FIG. 2A). Riboflavin in soluble form may be added as a photosensitizer to the liquid or the flow of liquid (step 206 of FIG. 2A). The riboflavin in soluble form may be adequately mixed with the liquid to create a homogenous solution. In some implementations, adding the riboflavin to the liquid or the flow thereof may involve regularly or continuously injecting the riboflavin in soluble form into regularly or continuously replenished liquid or flow thereof. The liquid or the flow of liquid may be converted into mist or steam that carries the riboflavin, and the mist or the steam that carries the riboflavin may be released into air (or other gas) (step 208 of FIG. 2A). A riboflavin-activating light may be emitted on the mist or the steam that carries the riboflavin within the air (step 210 of FIG. 2A). The emission of the riboflavin-activating light may be sufficient to activate the riboflavin to enhance a cross-linking of genetic material of cells or pathogens or extracellular genetic material within the air, for sterilization of the genetic material of the cells or the pathogens or the extracellular genetic material within the air. What is thereby produced is sterilized air which may be released or circulated in a chamber, a container, or a room. In some implementations, the riboflavin-activating light may be UV-C which may be emitted from one or more UV-C LEDs.

In some implementations, the mist or the steam may be discharged or released into the open air. In other implementations, the mist or the steam may be allowed to be released into circulating air (or other gas). This air may be injected into the chamber, the container, or the room and recirculated in an ongoing process. Thus, riboflavin in the mist or the steam form may be injected or added to the circulating air in an ongoing process as new or unsterilized air is brought into the system. In some implementations, the method may be for use in an air purifier system, a humidifier system, a heating and air duct system, an air conditioning (AC) system, or the like. Such a specific variation or implementation is described below in relation to FIG. 2B.

Figure 2B:
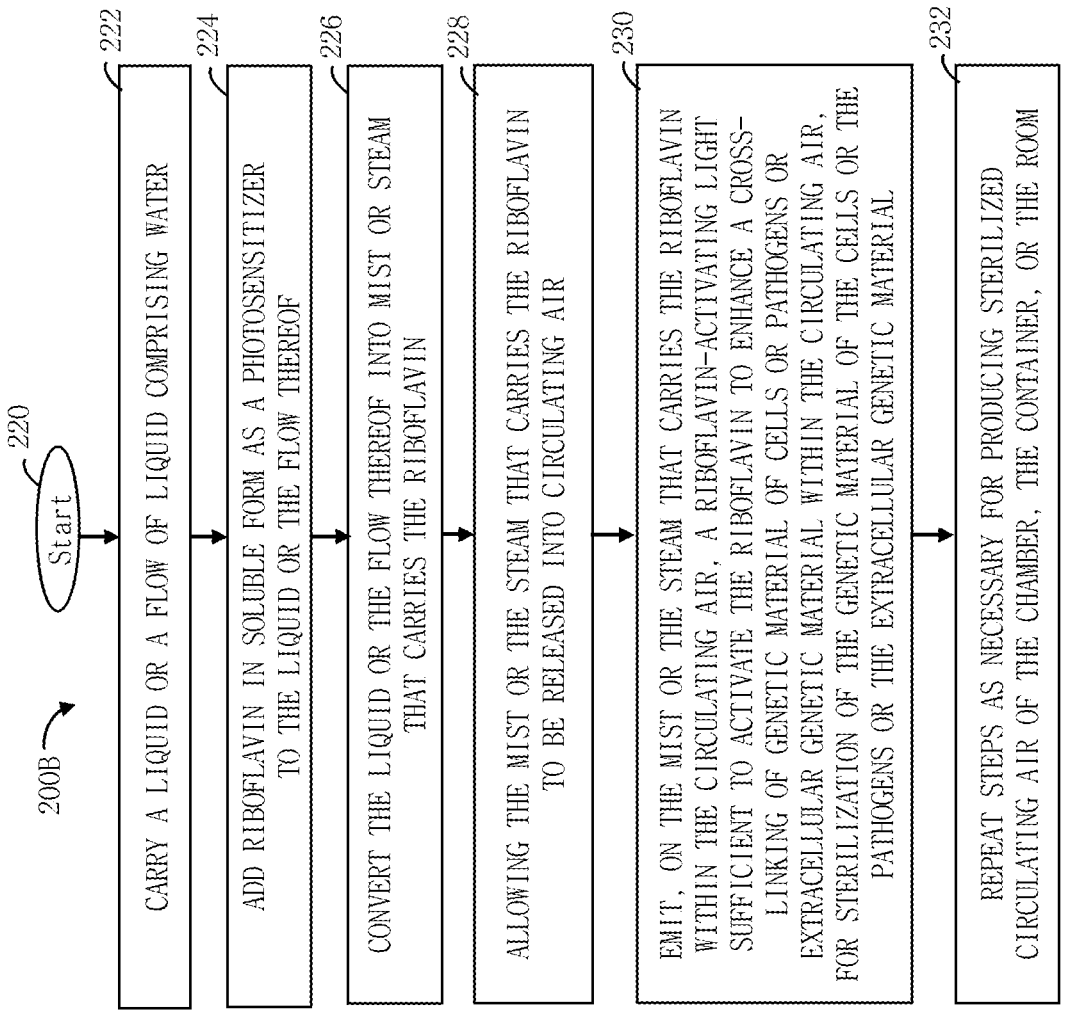
FIG. 2B is a flowchart for describing a method for use in sterilizing circulating air according to some implementations of the present disclosure, which may be a specific variation or implementation of the method of FIG. 2A.

FIG. 2B is a flowchart 200B for describing a method for use in sterilizing circulating air according to some implementations of the present disclosure, which may be a specific variation or implementation of the method of FIG. 2A. Beginning a start block 220 of FIG. 2B, a liquid or a flow of liquid comprising water may be carried, for example, in a holding container, a holding chamber, or a holding tank, or through a channel, a tube, or a pipe, etc. (step 222 of FIG. 2B). Riboflavin in soluble form may be added as a photosensitizer to the liquid or the flow of liquid (step 224 of FIG. 2B). The riboflavin in soluble form may be adequately mixed with the liquid to create a homogenous solution. In some implementations, adding the riboflavin to the liquid or the flow thereof may involve regularly or continuously injecting the riboflavin in soluble form into regularly or continuously replenished liquid or flow thereof. The liquid or the flow of liquid may be converted into mist or steam that carries the riboflavin (step 226 of FIG. 2B). The mist or the steam that carries the riboflavin may be allowed to be released into circulating air (or other gas) that is being circulated (step 228 of FIG. 2B). A riboflavin-activating light may be emitted on the mist or the steam that carries the riboflavin within the circulating air that is being circulated (step 230 of FIG. 2B). The emission of the riboflavin-activating light may be sufficient to activate the riboflavin to enhance a cross-linking of genetic material of cells or pathogens or extracellular genetic material within the circulating air, for sterilization of the genetic material of the cells or the pathogens or the extracellular genetic material. Steps of the method may be repeated as necessary for producing sterilized circulating air that is being circulated through a chamber, a container, or a room (step 232 of FIG. 2B). In some implementations, the circulating air may be directed to flow through the chamber, the container, or the room in an ongoing process, as new or unsterilized air is brought into the system. In some implementations, the riboflavin-activating light may be UV-C which may be emitted from one or more UV-C LEDs. In some implementations, the method may be for use in an air purifier system, a humidifier system, a heating and air duct system, an AC system, even a ventilator system, or the like.

In some implementations of FIGS. 2A and/or 2B, high-frequency sound or vibrational waves (e.g., ultrasonic waves) may be generated through the mist or the steam that carries the riboflavin (i.e., prior to discharge or release), sufficient to disrupt barriers of the cells or the pathogens, for increased access of the riboflavin and the UV-C to the genetic material of the cells or the pathogens for increased sterilization. In additional or alternative implementations, an increased pressure may be exerted and maintained on the mist or the steam that carries the riboflavin (i.e., prior to discharge or release), sufficient to disrupt barriers of the cells or the pathogens, for increased access of the riboflavin and the UV-C to the genetic material of the cells or the pathogens for increased sterilization. In some implementations, the liquid or the flow thereof may be converted into steam that carries the riboflavin, by heating the liquid or the flow thereof sufficient to disrupt barriers of the cells or the pathogens, for increased access of the riboflavin and the UV-C to the genetic material of the cells or the pathogens for increased sterilization.

FIGS. 3, 4, 5, and 6 are illustrative representations of different examples of various systems and apparatus which may apply the methods described above in relation to FIGS. 2A and 2B. Although a number of different examples are shown and described in relation to these figures, the methods are not limited to the same and may include additional or alternative features, details, variations, etc. as described elsewhere herein (in relation to the other figures or outside of the figures), or may alternatively be embodied in other systems and apparatus.

Figure 3:
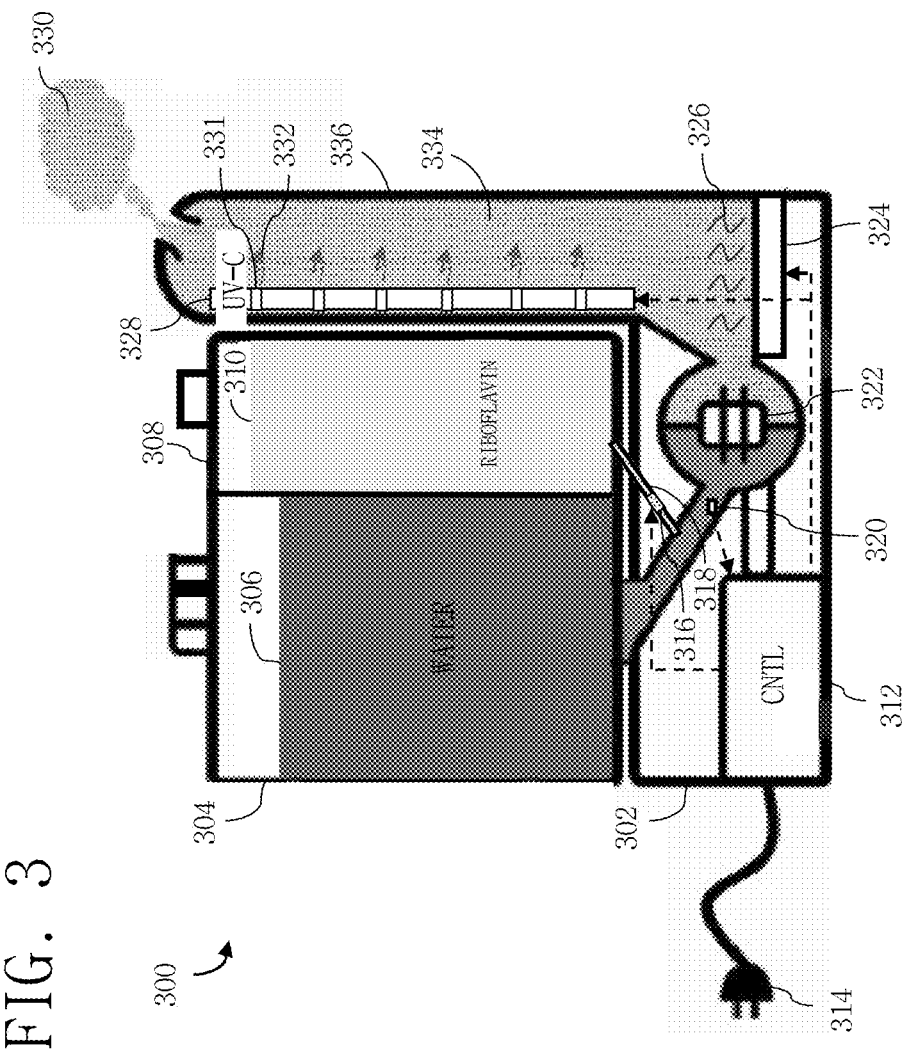
FIGS. 3, 4, 5, and 6 are illustrative representations of different examples of various systems and apparatus which may apply the methods described above in relation to FIGS. 2A-2B.

With respect to FIG. 3, what is shown is an illustrative representation of an example of a system 300 which is configured for sterilization of air according to some implementations of the present disclosure. System 300 may be or be referred to as a humidifier, and more particularly, as an air sterilization humidifier or an air purifier. As illustrated in FIG. 3, system 300 may include a housing structure 302 having a first tank 304 for carrying a liquid such as water 306 and a second tank 308 for carrying another liquid which is solubilized riboflavin 310 to be used as a photosensitizer. As illustrated, first tank 306 is fillable and includes a first cap for opening for filling; similarly, second tank 308 is fillable and includes a second cap for opening for filling. A connecting tube from first tank 304 permits water 306 in first tank 304 to be channeled to a vaporizer 322. A release tube 318 is connected between second tank 308 and the connecting tube, so that solubilized riboflavin 310 may be slowly released into and mixed with the water 306 in the connecting tube. Accordingly, a mixed, homogenous solution of water and soluble riboflavin may be received at vaporizer 322, which operates to vaporize the solution to thereby produce, within a steam chamber 336 (which also contains air), steam 334 that carries the riboflavin.

Control circuitry 312 may operate to control the amount of flow of solubilized riboflavin 310 to be mixed with the water 206, with use of a valve 316 which opens and closes the release tube 318. In general, control circuitry 312 may be used for control of electrical components of system 302, and receive electrical power from an alternating current (AC) power source via an AC power cord and plug 314. Control circuitry 312 may include any suitable circuitry for control, such as a controller, a microcontroller, a microprocessor, other similar circuitry, and may include memory having software instructions which operate to perform control according to the functions described.

In some implementations, control circuitry 312 may control the amount of flow of solubilized riboflavin 310 according to a predetermined flow setting value (or, e.g., a predetermined range of flow setting values). In some implementations, control circuitry 312 may control the amount of flow of solubilized riboflavin 310 for release using a continuous-variable setting of valve 316 and/or using a variable frequency setting to open and close the valve 316 in a pulsed on/off manner. In some implementations, a sensor 320 may be disposed in the connecting tube (or in any other suitable location after the riboflavin is mixed with the water) for a regular or real-time sensing and monitoring of a ratio or percentage of riboflavin to water. Control circuitry 312 may determine the ratio or percentage of riboflavin to water based on signals from sensor 320 and control the setting of valve 316 according to the predetermined flow setting value or predetermined range of flow setting values.

Steam 334 that is produced within steam chamber 336 carries the riboflavin which is used a photosensitizer. Control circuitry 312 may operate a set of UV-C LEDs 328 to produce UV-C light which is emitted on steam 334 within the air within steam chamber 336 (e.g., a UV-C LED 331 emits a UV-C light 332 on steam 334 within steam chamber 336). The emission of the UV-C light from the set of UV-C LEDs 328 is sufficient to activate the riboflavin that is carried by steam 334 to enhance a cross-linking of genetic material of cells or pathogens or extracellular genetic material within the air in steam chamber 336. This process may provide for sterilization of the genetic material of the cells or the pathogens or the extracellular genetic material in steam chamber 336. Steam 334 that is processed in this manner may be discharged or released to the open air, as sterilized steam 330, through an opening of steam chamber 336. Here, purified steam or air may be provided.

In some implementations, system 300 further includes a generator 324 which may be controlled by control circuitry 312 to produce high-frequency sound or vibrational waves 326 (e.g., ultrasonic waves) through the steam 334 that carries the riboflavin in steam chamber 336. The production of these high-frequency sound or vibration waves 326 are sufficient to disrupt barriers of cells or pathogens, for increased access of the riboflavin and the UV-C to the genetic material of the cells or the pathogens for increased sterilization. In additional or alternative implementations, control circuitry 312 may operate generator 324 to exert and maintain an increased pressure on the steam 334 that carries the riboflavin in steam chamber 336 (e.g., where steam chamber 336 is part of a pressure chamber), sufficient to disrupt barriers of the cells or the pathogens for increased access of the riboflavin and the UV-C to the genetic material of the cells or the pathogens for increased sterilization. Note that even the heating or vaporizing the solution of water and solubilized riboflavin into the steam 334 in steam chamber 336 is sufficient to disrupt barriers of the cells or the pathogens, for increased access of the riboflavin and the UV-C to the genetic material of the cells or the pathogens for increased sterilization.

Figure 4:
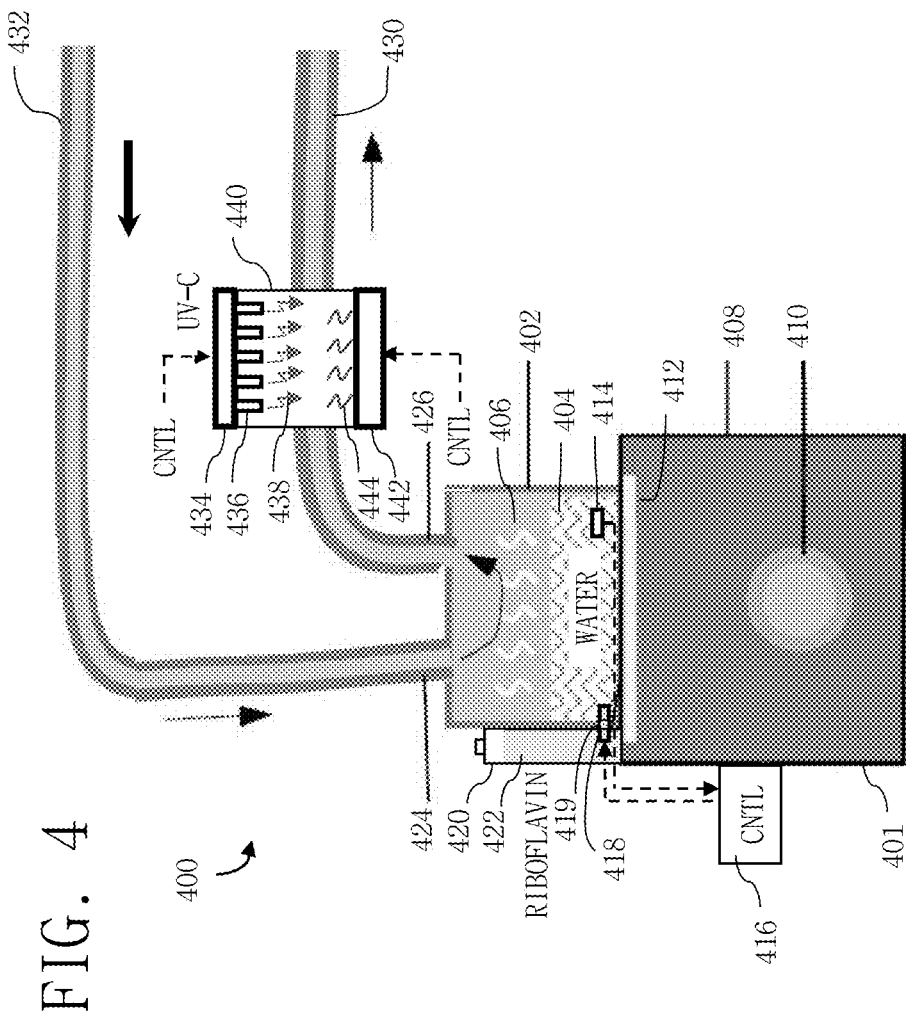

FIG. 4 is an illustrative representation of an example of a system 400 which is configured for sterilization of air or other suitable gas according to some implementations of the present disclosure. As illustrated in FIG. 4, system 400 has a housing structure 401 including a base unit 408, a first tank 402 for carrying a liquid such as water 404, and a second tank 420 for carrying another liquid which is solubilized riboflavin 422 to be used as a photosensitizer. A release tube 418 is connected between first tank 402 and second tank 420, so that solubilized riboflavin 422 may be slowly released into and mixed with the water 404 in the first tank 402. Accordingly, a mixed, homogenous solution of water and soluble riboflavin may be produced in first tank 402. A heating element 412 disposed under or in first tank 402 is operative to heat the solution to produce, within first tank 402, steam 406 that carries riboflavin. On the other hand, one or more other mechanisms 410 may additionally or alternatively be utilized to convert the solution to steam or vapor that carries the riboflavin.

Control circuitry 416 may operate to control the amount of flow of solubilized riboflavin 422 to be mixed with the water 404, with use of a valve 419 which opens and closes the release tube 418. In general, control circuitry 416 may be used for control of electrical components of system 400 and receive electrical power from a suitable power source. In some implementations, control circuitry 416 may control the amount of flow of solubilized riboflavin 422 according to a predetermined flow setting value (or, e.g., a predetermined range of flow setting values). In some implementations, control circuitry 416 may control the amount of flow of solubilized riboflavin 422 for release using a continuous-variable setting of valve 419 and/or using a variable frequency setting to open and close the valve 419 in a pulsed on/off manner. In some implementations, a sensor 414 may be disposed in first tank 402 for a regular or real-time sensing and monitoring of a ratio or percentage of riboflavin to water. Control circuitry 416 may determine the ratio or percentage of riboflavin to water based on signals from sensor 414 and control the setting of valve 419 according to the predetermined flow setting value or predetermined range of flow setting values.

An outlet tube 426 from first tank 402 permits the steam 406 that carries the riboflavin to be channeled to a sterilization chamber 440. Control circuitry 416 may operate a set of UV-C LEDs 434 of sterilization chamber 440 to produce UV-C light which is emitted on the steam that carries the riboflavin (e.g., a UV-C LED 436 emits a UV-C light 438 on the steam in sterilization chamber 440). The emission of the UV-C light from the set of UV-C LEDs 434 is sufficient to activate the riboflavin that is carried by the steam to enhance a cross-linking of genetic material of cells or pathogens or extracellular genetic material within sterilization chamber 440. This process may provide for sterilization of the genetic material of the cells or the pathogens or the extracellular genetic material within sterilization chamber 440. The steam which is processed in this manner may then be discharged or released, as sterilized steam, through an outlet tube 430 from sterilization chamber 440. In some implementations, air or other suitable gas may be circulated together with the discharging or the releasing of the sterilized steam, with further use a return tube 432 which returns to first tank 402. This ongoing recirculation may involve a regular or continuous redosing of solubilized riboflavin. In some implementations, system 400 of FIG. 4 may be part of a heating, ventilation, and air conditioning (HVAC) system or a ventilator system. In other implementations, the sterilized steam may be released into the open air.

In some implementations, system 400 further includes a generator 442 which may be controlled by control circuitry 416 to produce high-frequency sound or vibrational waves 444 (e.g., ultrasonic waves) through the steam that carries the riboflavin in sterilization chamber 440. The production of these high-frequency sound or vibration waves 444 are sufficient to disrupt barriers of cells or pathogens, for increased access of the riboflavin and the UV-C to the genetic material of the cells or the pathogens for increased sterilization. In additional or alternative implementations, control circuitry 416 may operate generator 442 to exert and maintain an increased pressure on the steam that carries the riboflavin in sterilization chamber 440 (e.g., where sterilization chamber 440 is part of a pressure chamber), sufficient to disrupt barriers of the cells or the pathogens for increased access of the riboflavin and the UV-C to the genetic material of the cells or the pathogens for increased sterilization. Note that even the heating or vaporizing the solution of water and solubilized riboflavin into the steam in first tank 402 is sufficient to disrupt barriers of the cells or the pathogens, for increased access of the riboflavin and the UV-C to the genetic material of the cells or the pathogens for increased sterilization.

Figure 5:
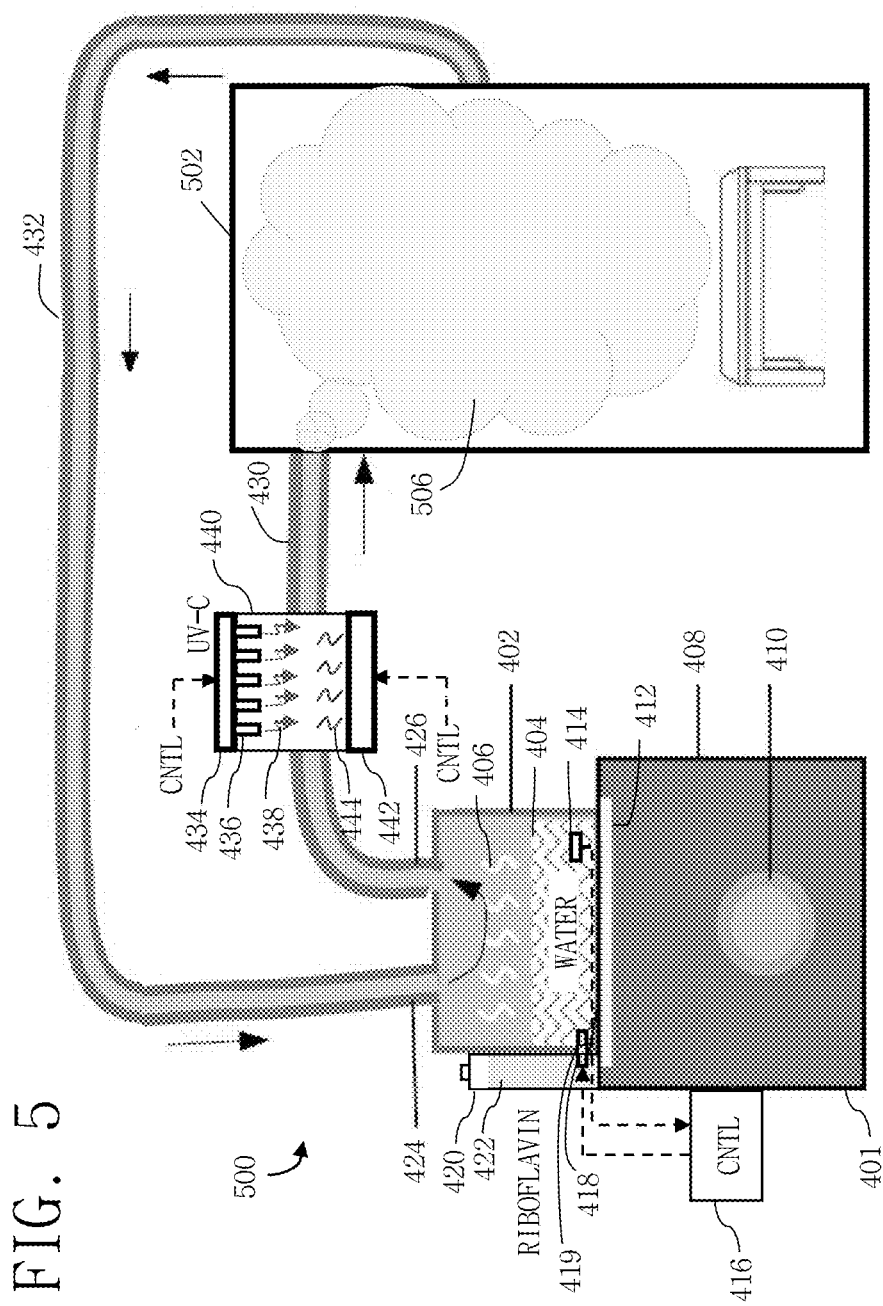

FIG. 5 is an illustrative representation of an example of a system 500 which is configured for sterilization of air or other suitable gas according to some implementations of the present disclosure. System 500 of FIG. 5 is substantially the same as system 400 of FIG. 4, with outlet tube 430 being connected to a room 502 so that the room 502 may be filled with a sterilized steam 506. In some implementations, air or other suitable gas may be circulated (e.g., using a blower or a fan) together with the sterilized steam 506, with use of return tube 432 that returns the air and/or sterilized steam 506 to first tank 402. Again, this ongoing recirculation may involve a regular or continuous redosing of solubilized riboflavin. In some implementations, system 500 of FIG. 5 may be part of an HVAC system or even a ventilator system.

To illustrate by example, for HVAC systems or the like, one may add riboflavin at the rate of 19 mg per 100 mL before it is converted into steam and thus solubilized. As humidified air is blown, solubilized riboflavin may be continually injected in a steam form into the ducts and into the rooms attached to the ducts (whether it be a home with multiple rooms, a hospital room, a laboratory, a surgical suite, or any other enclosure that is serviced by an HVAC system with a return). In some implementations, the circulating air may be pressurized in a pressure chamber with or without being subject to ultrasonication while being exposed to steamed riboflavin as well as an LED UV-C or other light source.

Figure 6:
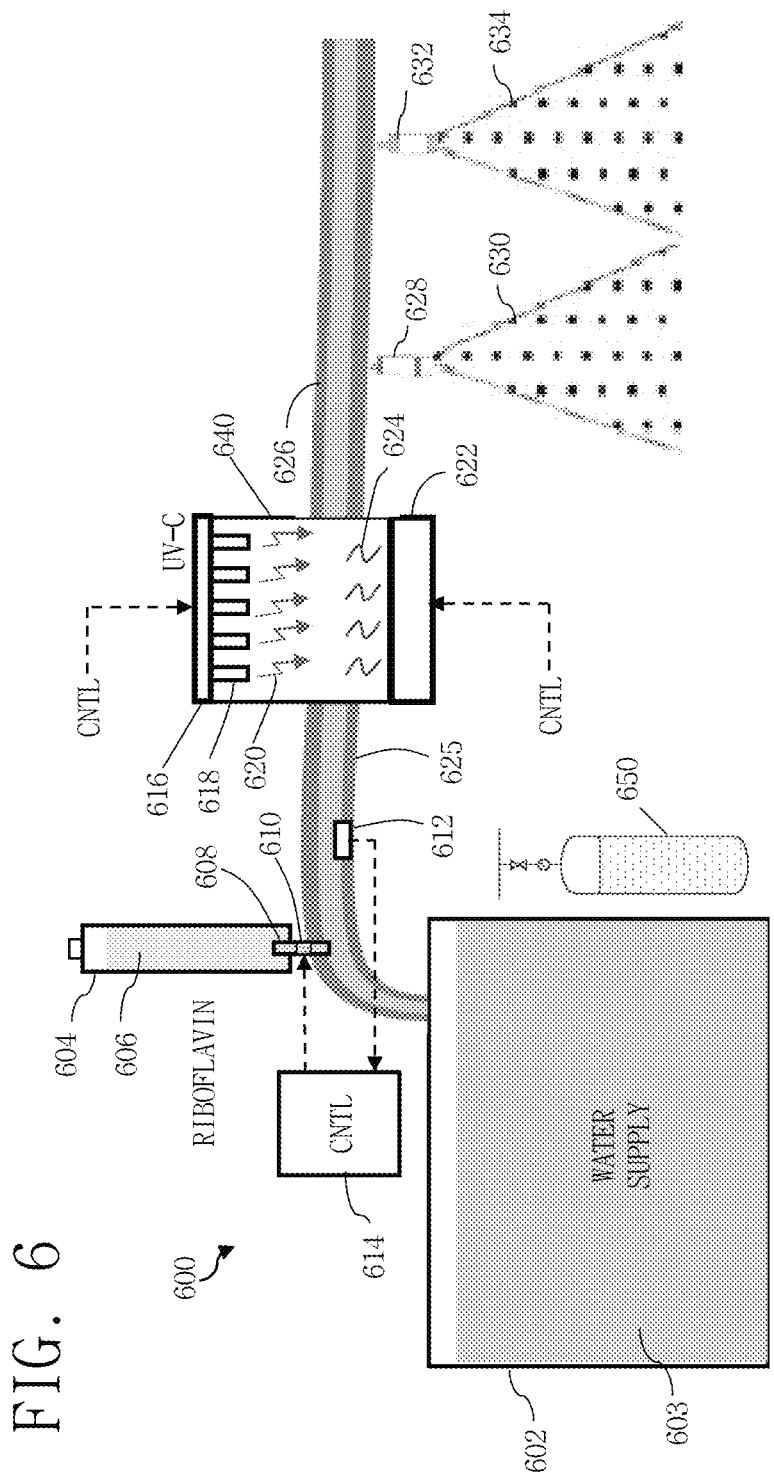

FIG. 6 is an illustrative representation of an example of a system 600 configured for producing a sterilized mist according to some implementations of the present disclosure. As illustrated in FIG. 6, system 600 includes a first tank 602 for carrying a liquid such as water 603 (e.g., water supply), a tube or a pipe 625 which transports the flow of liquid, and a second tank 604 for carrying another liquid which is solubilized riboflavin 606 to be used as a photosensitizer. In some implementations, system 600 may be used as part of (as installed in) a building water supply system, for example, in a typical residential or commercial setting. In some additional or alternative implementations, one or more tanks 650 of pressurized water may be utilized to create the flow of water. A release tube 608 may be connected between second tank 604 and pipe 625, so that solubilized riboflavin 606 may be released into and mixed with the flow of water in pipe 625. Accordingly, a mixed, homogenous solution of water and soluble riboflavin may be produced as a flow of liquid in the pipe 625.

Control circuitry 614 may operate to control the amount of flow of solubilized riboflavin 606 to be mixed with the flow of water in pipe 624, with use of a valve 610 which opens and closes the release tube 608. In general, control circuitry 614 may be used for control of electrical components of system 600 and receive electrical power from a suitable power source. In some implementations, control circuitry 614 may control the amount of flow of solubilized riboflavin 606 according to a predetermined flow setting value (or, e.g., a predetermined range of flow setting values). In some implementations, control circuitry 614 may control the amount of flow of solubilized riboflavin 606 for release using a continuous-variable setting of valve 610 and/or using a variable frequency setting to open and close the valve 610 in a pulsed on/off manner. In some implementations, a sensor 612 may be disposed in pipe 625 (or any other suitable location) for a regular or real-time sensing and monitoring of a ratio or percentage of riboflavin to water. Control circuitry 614 may determine the ratio or percentage of riboflavin to water based on signals from sensor 612 and control the setting of valve 610 according to the predetermined flow setting value or predetermined range of flow setting values.

Pipe 625 from first tank 602 routes the flow of liquid that carries the riboflavin to a sterilization chamber 640. Control circuitry 614 may operate a set of UV-C LEDs 616 of sterilization chamber 640 to produce UV-C light which is emitted on the flow of liquid that carries the riboflavin (e.g., a UV-C LED 618 emits a UV-C light 620 on the flow of liquid). The emission of the UV-C light from the set of UV-C LEDs 616 is sufficient to activate the riboflavin that is carried in the liquid to enhance a cross-linking of genetic material of cells or pathogens or extracellular genetic material in the liquid. This process may provide for the sterilization of the genetic material of the cells or the pathogens or the extracellular genetic material in the flow of liquid. The flow of liquid which is processed in this manner may be routed out of sterilization chamber 640 through an outlet pipe 626. One or more nozzles 628, 632 along outlet pipe 626 may discharge or release the flow of liquid as a sterilized mist 630, 634 (e.g., into the open air or a room).

In some implementations, sterilization chamber 640 further includes a generator 622 which may be controlled by control circuitry 614 to produce high-frequency sound or vibrational waves 624 (e.g., ultrasonic waves) through the flow of liquid that carries the riboflavin in sterilization chamber 640. The production of these high-frequency sound or vibration waves 624 are sufficient to disrupt barriers of cells or pathogens, for increased access of the riboflavin and the UV-C to the genetic material of the cells or the pathogens for increased sterilization. In additional or alternative implementations, control circuitry 614 may operate generator 622 to exert and maintain an increased pressure on the flow of liquid that carries the riboflavin in sterilization chamber 640 (e.g., where sterilization chamber 622 is part of a pressure chamber), sufficient to disrupt barriers of the cells or the pathogens for increased access of the riboflavin and the UV-C to the genetic material of the cells or the pathogens for increased sterilization.

Figure 7:
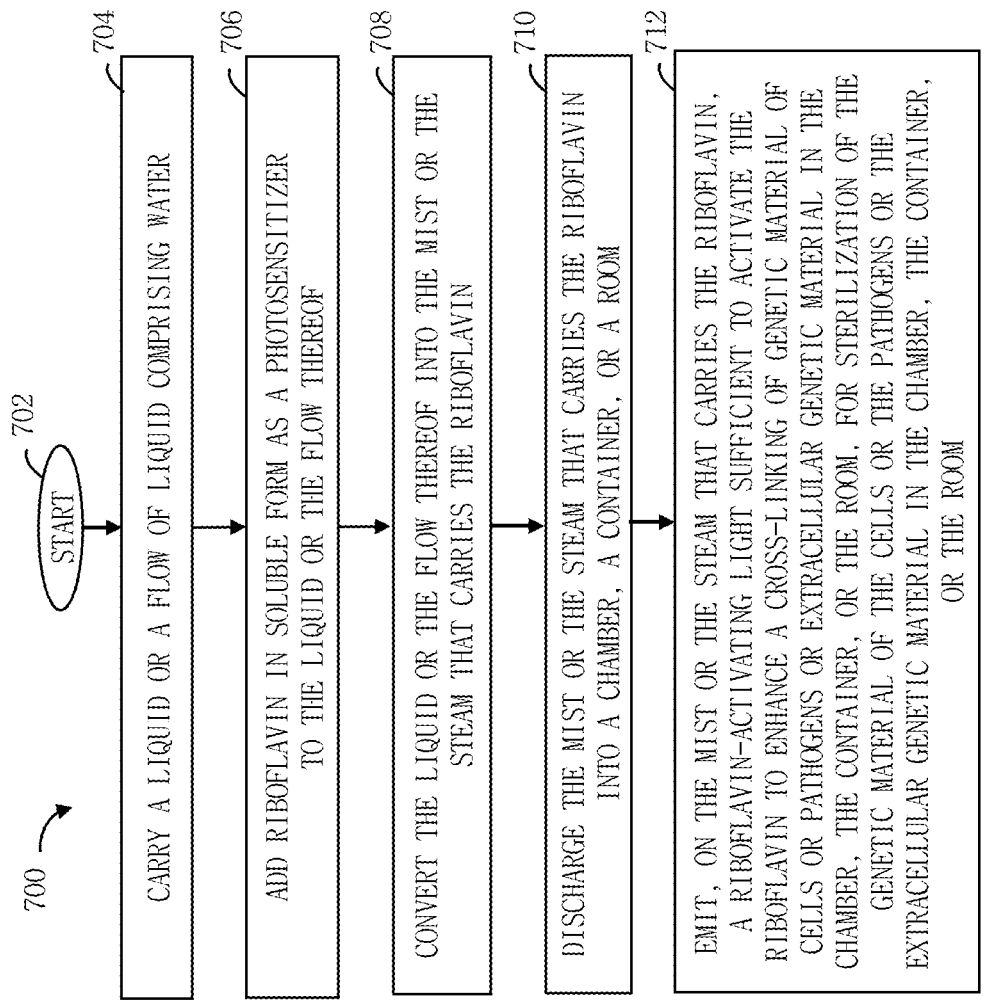
FIG. 7 is a flowchart for describing a method for use in sterilization of one or more objects or surfaces in a chamber, a container, or a room, and/or sterilization of the chamber, the container, or the room itself, according to some implementations of the present disclosure.
Figure 8:
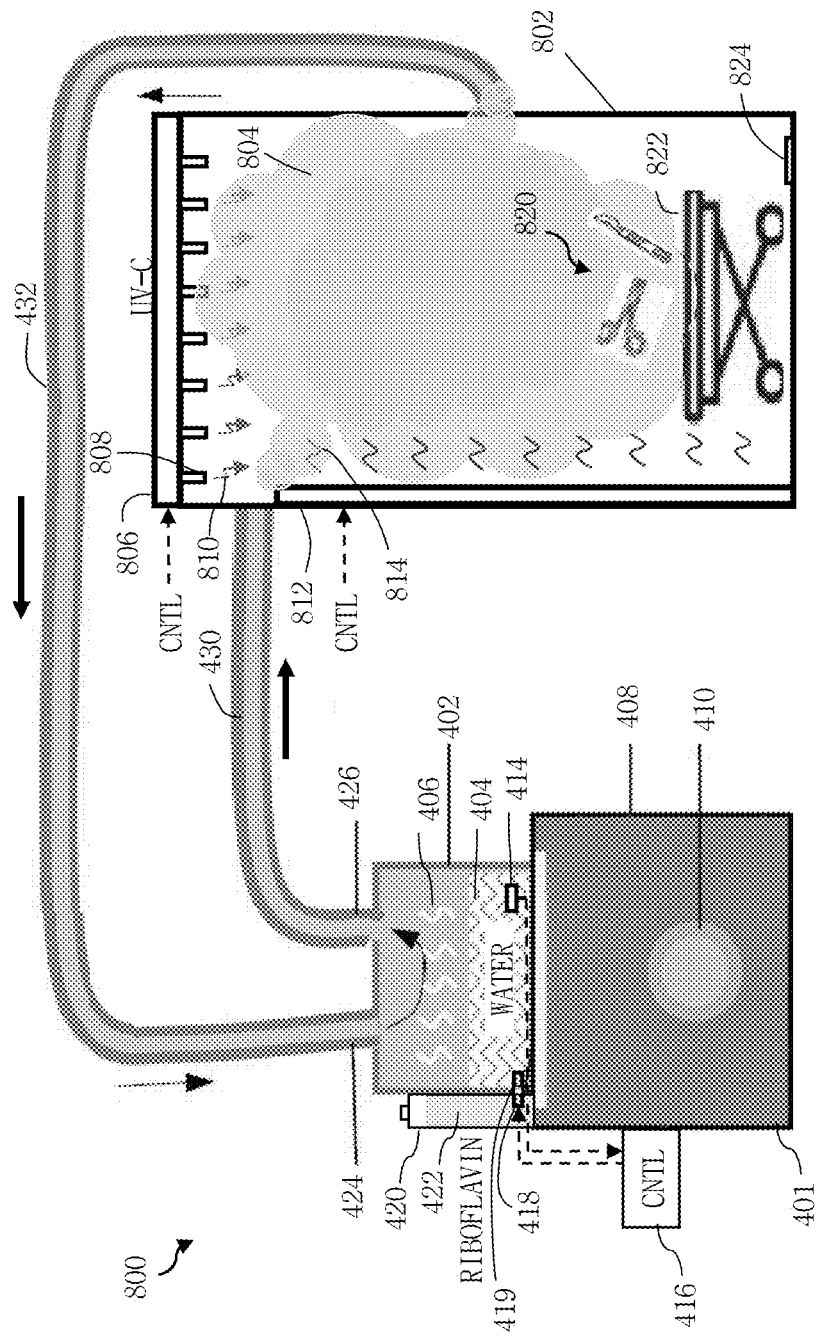
FIGS. 8, 9, and 10 are illustrative representations of different examples of various systems and apparatus which may apply the methods described above in relation to FIG. 7.
Figure 9:
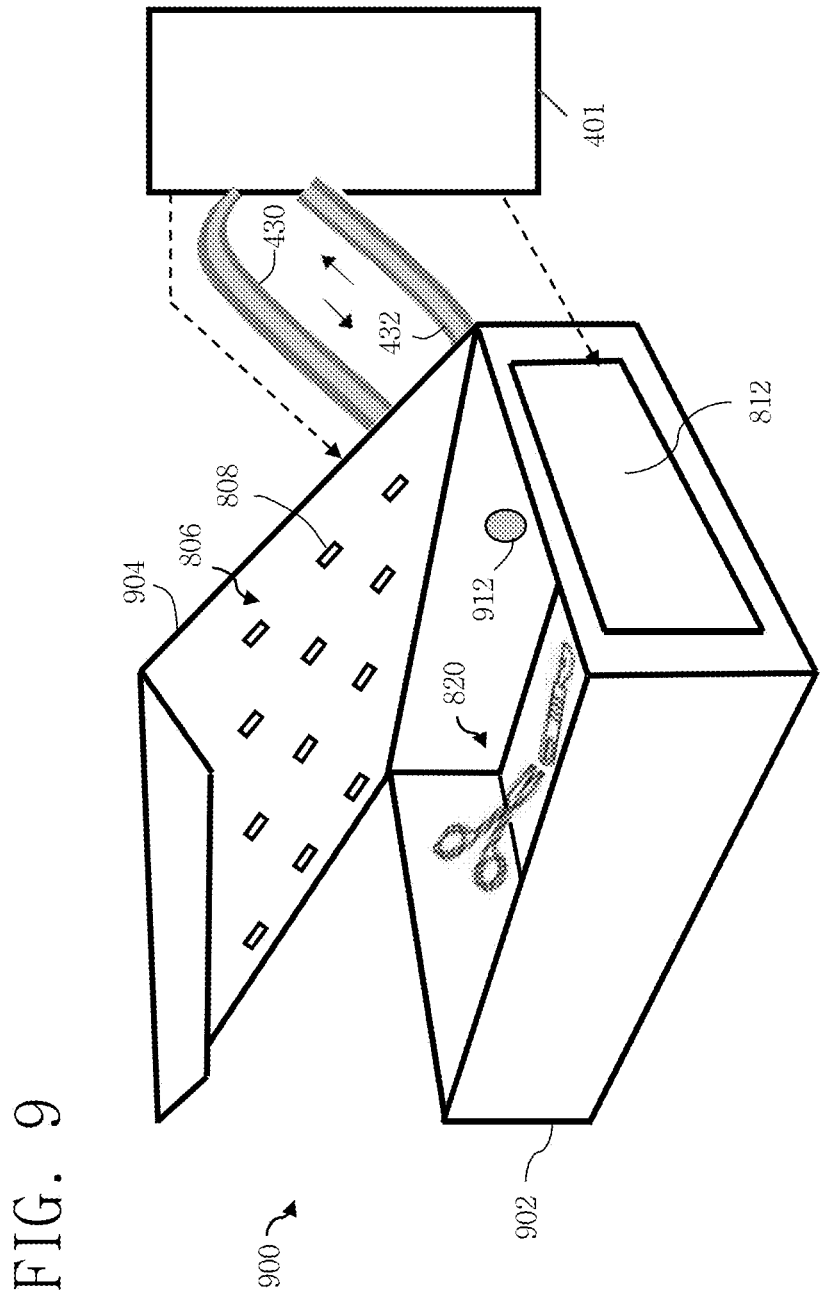
Figure 10:
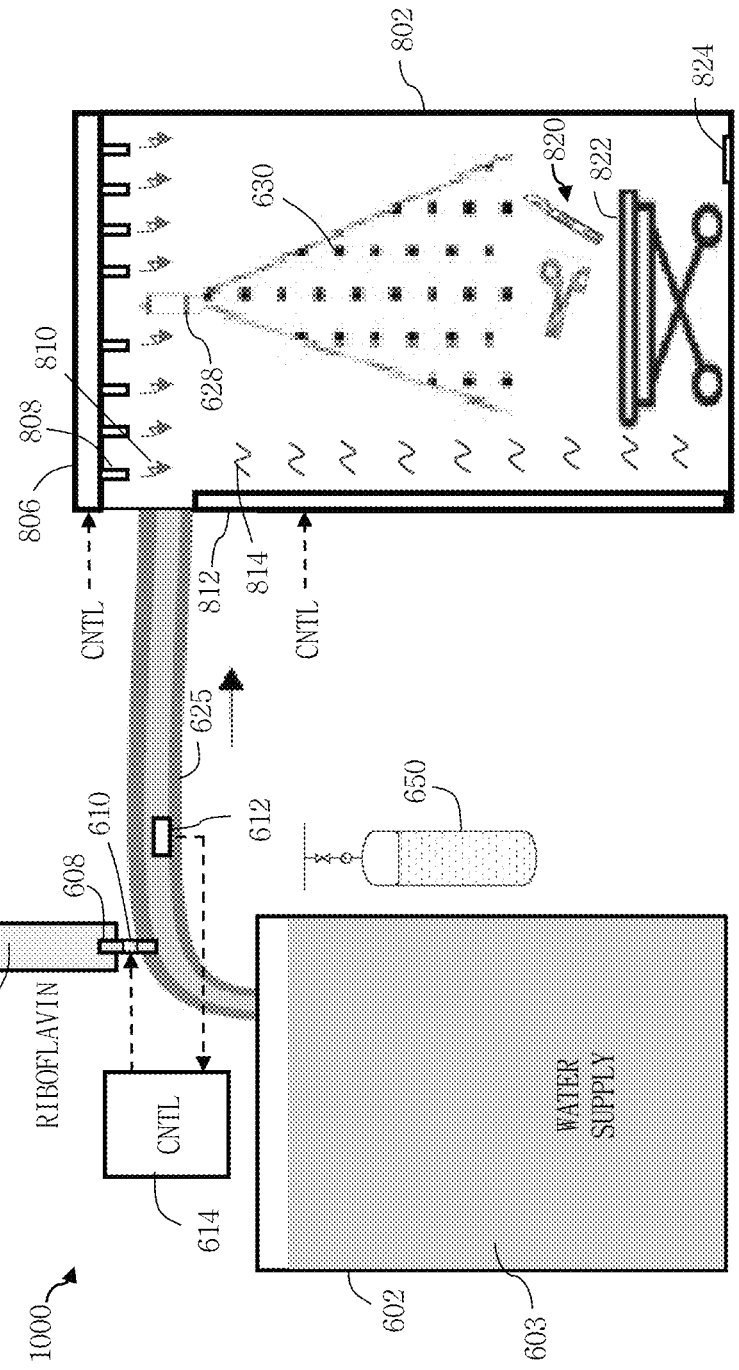

FIG. 7 is a flowchart 700 for describing a method for use in sterilization of one or more objects or surfaces in a chamber, a container, or a room, and/or sterilization of the chamber, the container, or the room itself, according to some implementations of the present disclosure. To be described hereinafter, FIGS. 8, 9, and 10 are illustrative representations of different examples of various systems and apparatus which may apply the methods described in relation to FIG. 7.

Beginning a start block 702 of FIG. 7, a liquid or a flow of liquid comprising water may be carried, for example, in a holding container, a holding chamber, or a holding tank, or through a channel, a tube, or a pipe, etc. (step 704 of FIG. 7). Riboflavin in soluble form may be added as a photosensitizer to the liquid or the flow of liquid (step 706 of FIG. 7). The riboflavin in soluble form may be adequately mixed with the liquid to create a homogenous solution. In some implementations, adding the riboflavin to the liquid or the flow thereof may involve regularly or continuously injecting the riboflavin in soluble form into regularly or continuously replenished liquid or flow thereof. The liquid or the flow of liquid may be converted into mist or steam that carries the riboflavin (step 708 of FIG. 7). The mist or the steam that carries the riboflavin may be discharged or released into a chamber, a container, or a room (step 710 of FIG. 7). In some implementations, air may be circulated through the chamber, the container, or the room, together with the discharging of the mist or the steam that carries the riboflavin.

A riboflavin-activating light may be emitted on the mist or the steam that carries the riboflavin in the chamber, the container, or the room (e.g., during its suspension in the air and/or after its surface settling) (step 712 of FIG. 7). The emission of the riboflavin-activating light may be sufficient to activate the riboflavin to enhance a cross-linking of genetic material of cells or pathogens or extracellular genetic material in the chamber, the container, or the room, for sterilization of the genetic material of the cells or the pathogens or the extracellular genetic material. In some implementations, the riboflavin-activating light may be UV-C which may be emitted from one or more UV-C LEDs. In some implementations, the emission of the riboflavin-activating light on the mist or the steam that carries the riboflavin causes one or more objects or surfaces in the chamber, the container, or the room to be disinfected, and/or sterilization of the chamber, the container, or the room itself.

In some implementations, high-frequency sound or vibrational waves (e.g., ultrasonic waves) may be generated in the chamber, the container, or the room, sufficient to disrupt barriers of the cells or the pathogens or surface films in the chamber, the container, or the room, for increased access of the riboflavin and the UV-C to the genetic material of the cells or the pathogens or the extracellular genetic material for increased sterilization. In some additional or alternative implementations, an increased pressure may be exerted and maintained on the mist or the steam that carries the riboflavin in the chamber, the container, or the room, sufficient to disrupt barriers of the cells or the pathogens or surface films in the chamber, the container, or the room, for increased access of the riboflavin and the UV-C to the genetic material of the cells or the pathogens or the extracellular genetic material for increased sterilization. In some implementations, the liquid or the flow thereof may be converted into steam that carries the riboflavin by heating the liquid or the flow thereof into the steam, sufficient to disrupt barriers of the cells or the pathogens or surface films in the chamber, the container, or the room, for increased access of the riboflavin and the UV-C to the genetic material of the cells or the pathogens or the extracellular genetic material for increased sterilization.

In a specific variation of the method of FIG. 7, the step 708 of converting the liquid into the mist or the steam may be omitted, where instead the liquid that carries the riboflavin may itself be discharged into the chamber, the container, or the room. Here, in some implementations, especially if regular ongoing injections of riboflavin are necessary, then recirculation of the dispensed liquid after sterilization by the UV-C light may also be performed, especially to avoid increasing humidity and later condensation in the chamber, the container, or the room. In some implementations, after removal of the liquid by recirculation, a dehumidification process may be performed so that dry air and/or surfaces are left in the chamber, the container, or the room. Thus, after discharging the liquid that carries the riboflavin in the chamber, the container, or the room, the liquid may be removed from the chamber, the container, or the room, and this removal may be followed by a dehumidification process to sufficiently dry the inside of the chamber, the container, or the room, in full or in part.

FIGS. 8, 9, and 10 are illustrative representations of different examples of various systems and apparatus which may apply the methods described above in relation to FIG. 7. Although a number of different examples are shown and described in relation to these figures, the methods are not limited to the same and may include additional or alternative features, details, variations, etc. as described elsewhere herein (in relation to the other figures or outside of the figures), or may alternatively be embodied in other systems and apparatus.

In FIG. 8, what is shown is an illustrative representation of an example of a system 800 which is configured for sterilization of a room and/or one or more objects in the room according to some implementations of the present disclosure. System 800 of FIG. 8 is substantially the same as system 500 of FIG. 5, except that the sterilization chamber of FIG. 5 is omitted, and the components of the sterilization chamber are provided in a room 802. The steam from the first tank 402 is discharged or released via outlet tube 430 into the room 802, and illustrated in FIG. 8 as steam 804 that carries the riboflavin. Control circuitry 416 may operate a set of UV-C LEDs 806 that are equipped (e.g., on a ceiling) in the room 802 to produce UV-C light which is emitted on the steam 804 that carries the riboflavin (e.g., a UV-C LED 808 emits a UV-C light 810 on the steam 804). The emission of the UV-C light from the set of UV-C LEDs 806 is sufficient to activate the riboflavin that is carried by the steam 804 to enhance a cross-linking of genetic material of cells or pathogens or extracellular genetic material in room 802. This process may provide for sterilization of the genetic material of the cells or the pathogens or the extracellular genetic material in room 802. In some implementations, air or other suitable gas may be circulated (e.g., using a blower or a fan) together with the discharging or the releasing of the steam 804, with further use return tube 432 for returning the stream towards first tank 402. Again, this ongoing recirculation may involve a regular or continuous redosing of solubilized riboflavin. In some implementations, system 800 of FIG. 8 may be part of an HVAC system. In some implementations, system 800 of FIG. 8 may be employed in a surgical suite, a surgical room, or a hospital room.

In some implementations, room 802 is further equipped with a generator 812 which may be controlled by control circuitry 416 to produce high-frequency sound or vibrational waves 814 (e.g., ultrasonic waves) through the steam 804 that carries the riboflavin in room 802. The production of these high-frequency sound or vibration waves 814 are sufficient to disrupt barriers of cells or pathogens, for increased access of the riboflavin and the UV-C to the genetic material of the cells or the pathogens for increased sterilization. In additional or alternative implementations, control circuitry 416 may operate generator 812 to exert and maintain an increased pressure on the steam 804 that carries the riboflavin in room 802 (e.g., where room 802 is equipped as a pressure chamber), sufficient to disrupt barriers of the cells or the pathogens for increased access of the riboflavin and the UV-C to the genetic material of the cells or the pathogens for increased sterilization. Note that even the heating or vaporizing the solution of water and solubilized riboflavin into the steam in first tank 402 is sufficient to disrupt barriers of the cells or the pathogens, for increased access of the riboflavin and the UV-C to the genetic material of the cells or the pathogens for increased sterilization.

In a typical case scenario, room 802 may include one or more objects 820 and surfaces 822. The one or more objects 820 may include any suitable objects, such as medical instruments or medical equipment. Here, the emission of the UV-C light on the steam 804 that carries the riboflavin may cause the one or more objects 820 and/or surfaces 822 in room 802 to be disinfected. Room 802 and/or the one or more objects 820 and surfaces 822 thereof may also have a surface film 824 or obstruction, such as a biofilm, which obstructs access to genetic material of cells or pathogens or extracellular genetic material. In some implementations, the high-frequency sound or vibrational waves 814 that are produced are sufficient to disrupt the surface film 824 for increased access of the riboflavin and the UV-C to the genetic material of the cells or the pathogens for increased sterilization. In additional or alternative implementations, the increased pressure that is exerted and maintained is sufficient to disrupt the surface film 824 for increased access of the riboflavin and the UV-C to the genetic material of the cells or the pathogens for increased sterilization.

To illustrate by example, for HVAC-based systems or the like, one may add riboflavin at the rate of 19 mg per 100 mL before it is converted into steam and thus solubilized. As humidified air is blown, solubilized riboflavin may be continually injected in a steam form into the ducts and into the rooms attached to the ducts (whether it be a home with multiple rooms, a hospital room, a laboratory, a surgical suite, or any other enclosure that is serviced by an HVAC system with a return). In some implementations, the circulating air may be pressurized in a pressure chamber (with or without being subject to ultrasonication) while being exposed to steamed riboflavin as well as an LED UV-C or other light source.

In order to best sterilize a room, one may employ several different emitters of steamed riboflavin or aerosolized ambient temperature riboflavin to fill the volume of the room at desired concentrations of riboflavin. In addition, one may employ several LED UV-C light sources that could cover the entire surface area, as well as volume of the room, in order to deliver the desired energy dosage. The same would be true for using ultrasonic or sonication, in terms of covering the entire surface area and volume of the room. Regarding the use of hydrostatic pressure, one could omit it or employ one of two other choices, the second being more practical than the first. In the first, the room should be self-contained that could be pressurized in the setting of ambient room temperature riboflavin or steamed riboflavin and a UV-C light sources with or without ultrasonic or sonication. Such self-pressurized rooms do exist, but they are expensive and not common. In the second, one may add to the system of an LED UV-C light source, aerosolized ambient room temperature or steamed riboflavin, with or without ultrasonic or sonication, and then draw in the air that contains the aerosolized ambient room temperature or steamed riboflavin through multiple vents and subject them to increased hydrostatic pressure, in conjunction with an LED UV-C light source or other light source and/or ultrasonic or sonication.

FIG. 9 is an illustrative representation of an example of a system 900 configured for sterilization one or more objects according to some implementations of the present disclosure. System 900 of FIG. 9 may be substantially the same as system 800 of FIG. 8 (e.g., operating in the same or similar manner), except that the room of FIG. 8 is omitted and replaced with a container 902 adapted to receive the one or more objects 822. Container 902 has a hinged lid 904 which may be opened to receive the one or more objects 822 and closed for object sterilization. The set of UV-C LEDs 806 including UV-C LED 808 may be provided on hinged lid 904 (or other position) and directed toward the one or more objects 822 placed in container 902. In some implementations, housing structure 401 which is in FIG. 9 (e.g., reduced in size accordingly) may include any necessary components from FIG. 8 (e.g., the first tank for carrying the liquid such as water, the second tank for carrying the solubilized riboflavin, the heating element, the control circuitry, etc.). In this example, housing structure 401 is provided as a unit that is separate from container 902. An opening 912 in container 902 from outlet tube 430 is shown, for the discharging or releasing of the steam that carries the riboflavin. Generator 812 may be suitably disposed and positioned in container 902 (whether along the bottom or the side of container 902).

In system 900, where container 902 may be referred to as a "sterilization box," a "return" is provided as in an HVAC system, allowing one to continuously inject steamed riboflavin into the box (e.g., ongoing recirculation and redosing of the solubilized riboflavin). Increasing hydrostatic pressure (HHP 500 MPa for a minimum of 5 minutes) may be provided to enhance killing by disrupting capsid structures (such as in non-enveloped viruses as well as the envelope and capsid of enveloped viruses), with or without the addition of ultrasonication during the exposure to the LED UV-C light. Such disruption enables the photosensitizer to more easily enter into the pathogen and gain access to the DNA and/or RNA, to be activated for enhanced cross-linking by the LED UV-C light. In some implementations, container 902 may have reflective surfaces to enhance the effect of the LED UV-C light source. In some implementations, a dehumidifier feature may be added at the end of the sterilization process in order to remove any excess moisture.

FIG. 10 is an illustrative representation of an example of a system 1000 configured for sterilizing a room and/or one or more objects in the room according to some implementations of the present disclosure. System 1000 of FIG. 10 may be substantially the same as system 600 of FIG. 6 with respect to the production of the flow of liquid that carries the riboflavin, and with respect to the creation of the mist that carries the riboflavin (e.g., operating in the same or similar manner), however it makes use of the room of FIG. 8 for sterilization (e.g., with use of UV-C light and other). One or more nozzles (e.g., nozzle 628) may provide mist (e.g., mist 630) as described previously in relation to FIG. 6. Here, the emission of the UV-C light on the mist 630 that carries the riboflavin may cause the one or more objects 820 and/or surfaces 822 in room 802 to be disinfected. In some implementations, system 1000 of FIG. 10 may be employed in a surgical suite, a surgical room, or a hospital room.

Room 802 and/or the one or more objects 820 and surfaces 822 thereof may also have surface film 824 or obstructions, such as a biofilm, which obstructs access to genetic material of cells or pathogens or extracellular genetic material. Again, in some implementations, the high-frequency sound or vibrational waves 814 (e.g., ultrasonic waves) that are produced are sufficient to disrupt the surface film 824 for increased access of the riboflavin and the UV-C to the genetic material of the cells or the pathogens for increased sterilization. In other implementations, the increased pressure that is exerted and maintained is sufficient to disrupt the surface film 824 for increased access of the riboflavin and the UV-C to the genetic material of the cells or the pathogens for increased sterilization.

Note that the present techniques as described may also allow for the reuse of equipment. In one illustrative example, personal protective equipment (PPE) may be reused if adequately exposed to the methods described herein. PPE was in short supply during the initial phase of the COVID pandemic, at least in part because there was minimal local production; also, ventilation units were in short supply. Although a part of this reflects the lack of local production, with use of the techniques described herein, one should be able to reuse ventilators, including parts directly connected to a patient if adequately sterilized. Similarly, other medical instruments may be reused, including endoscopes, as it is known that the virus may be found not only in respiratory secretions but also in feces.

Figure 11:
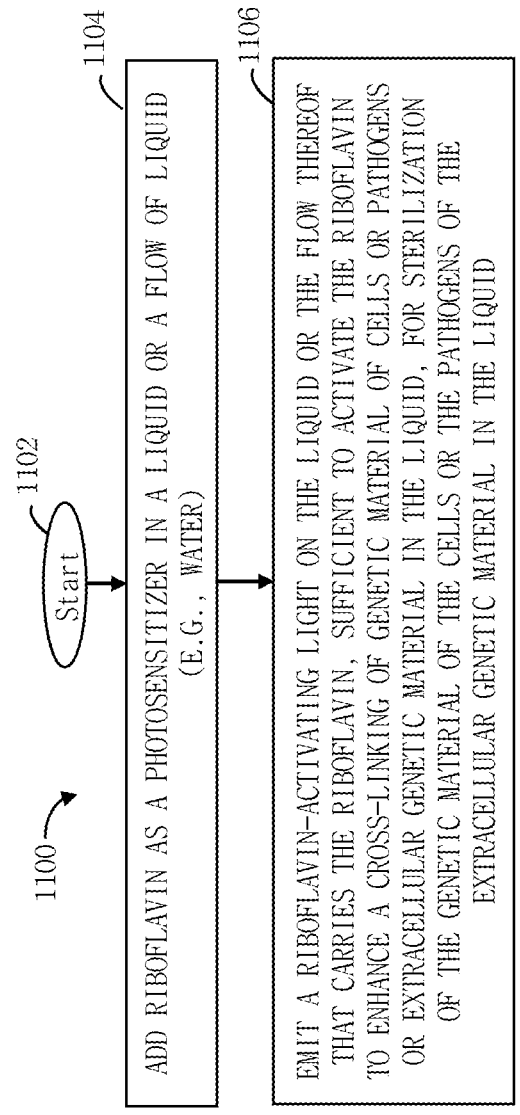
FIG. 11 is a flowchart for describing a method for use in disinfecting a liquid (e.g., water) according to some implementations of the present disclosure.

FIG. 11 is a flowchart 1100 for describing a method for use in disinfecting a liquid (e.g., water) according to some implementations of the present disclosure. To be described hereinafter, FIGS. 12-13 are illustrative representations of different examples of various systems and apparatus which may apply the methods described in relation to FIG. 11.

Initially, the liquid or a flow of the liquid may be carried, for example, in a holding container, a holding chamber, or a holding tank, or through a channel, a tube, or a pipe, etc. Beginning at a start block 1102 of FIG. 11, riboflavin as a photosensitizer may be added in the liquid or a flow of liquid (step 1104 of FIG. 11). The riboflavin may be added in the liquid or the flow of liquid in raw or soluble form, and adequately mixed therewith to create a homogenous solution. A riboflavin-activating light may be emitted on the liquid or the flow thereof that carries the riboflavin (step 1106 of FIG. 11). The emission of the riboflavin-activating light may be sufficient to activate the riboflavin to enhance a cross-linking of genetic material of cells or pathogens or extracellular genetic material in the liquid, for sterilization of the genetic material of the cells or the pathogens or the extracellular genetic material in the liquid. In some implementations, the riboflavin-activating light may be UV-C which may be emitted from one or more UV-C LEDs.

In some implementations, high-frequency sound or vibrational waves (e.g., ultrasonic waves) may be generated in the liquid or flow thereof that carries the riboflavin, sufficient to disrupt barriers of the cells or the pathogens in the liquid, for increased access of the riboflavin and the UV-C to the genetic material of the cells or the pathogens for increased sterilization. In other implementations, an increased pressure may be exerted and maintained on the liquid or flow thereof that carries the riboflavin, sufficient to disrupt barriers of the cells or the pathogens in the liquid, for increased access of the riboflavin and the UV-C to the genetic material of the cells or the pathogens for increased sterilization. In some implementations, the liquid or the flow thereof that carries the riboflavin may be heated sufficiently to disrupt barriers of the cells or the pathogens in the liquid, for increased access of the riboflavin and the UV-C to the genetic material of the cells or the pathogens for increased sterilization. In some implementations, the liquid comprises water, and the method of FIG. 11 is for use in water sterilization.

Figure 12:
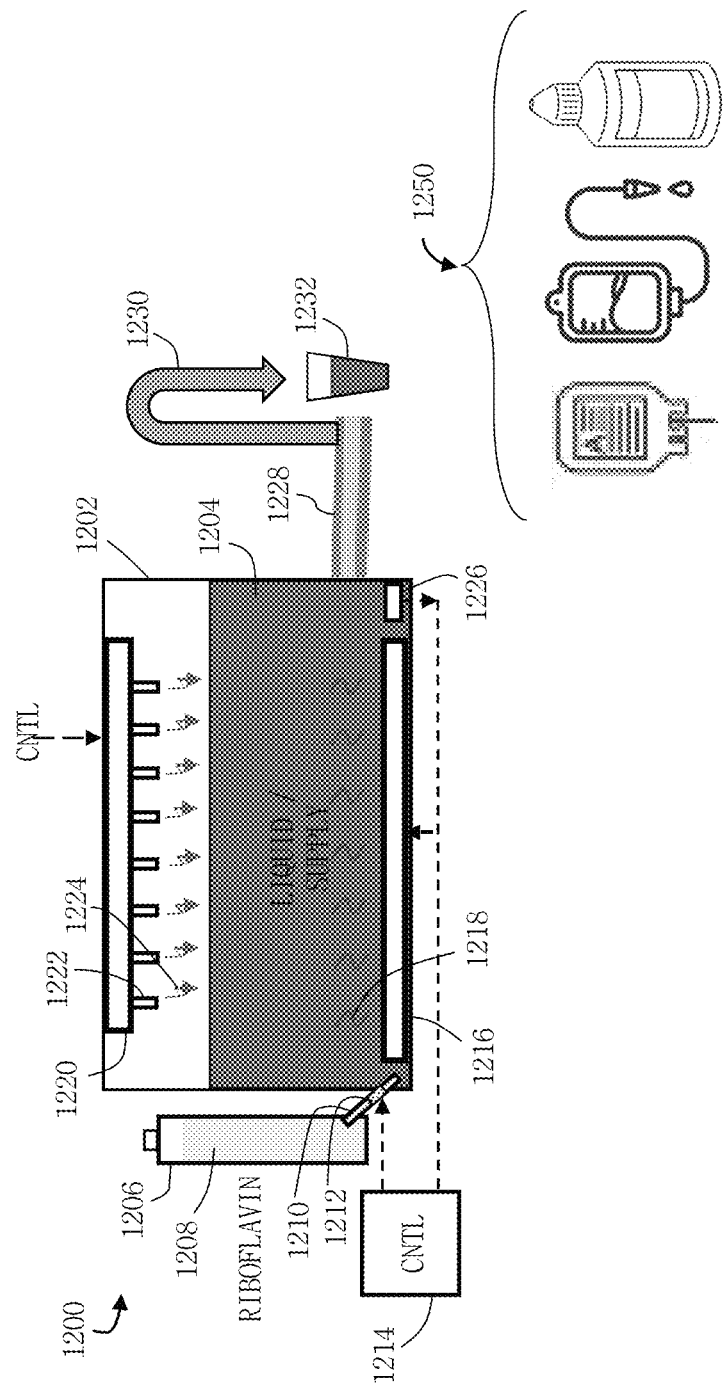
FIGS. 12-13 are illustrative representations of different examples of various systems and apparatus which may apply the methods described above in relation to FIG. 11.
Figure 13:
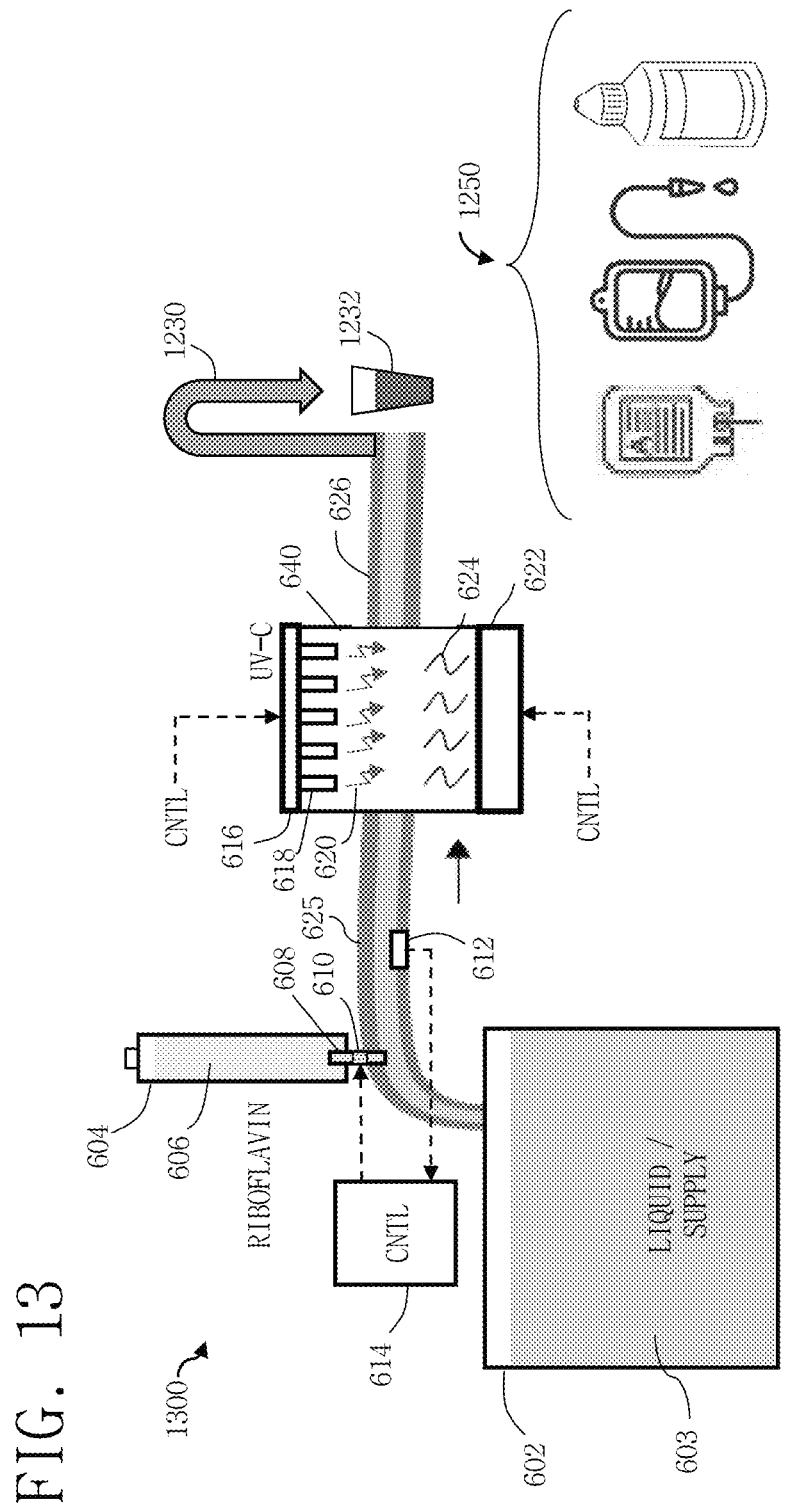

FIGS. 12-13 are illustrative representations of different examples of various systems and apparatus which may apply the methods described above in relation to FIG. 11. Although a number of different examples are shown and described in relation to these figures, the methods are not limited to the same and may include additional or alternative features, details, variations, etc. as described elsewhere herein (in relation to the other figures or outside of the figures), or may alternatively be embodied in other systems and apparatus.

In FIG. 12, what is shown is an illustrative representation of an example of a system 1200 configured for disinfecting a liquid (e.g., water or other) according to some implementations of the present disclosure. As illustrated in FIG. 12, system 1200 has a housing structure which includes a first tank 1202 for carrying a liquid 1204 such as water (e.g., a liquid or water supply) and a second tank 1206 for carrying another liquid which is solubilized riboflavin 1208 to be used as a photosensitizer. A release tube 1210 is connected between first tank 1202 and second tank 1206, so that solubilized riboflavin 1208 may be slowly released into and mixed with the liquid 1204 in the first tank 1202. Accordingly, a mixed, homogenous solution of water and soluble riboflavin may be produced in first tank 1202.

Control circuitry 1214 may operate to control the amount of flow of solubilized riboflavin 1208 to be mixed with the liquid 1204, with use of a valve 1212 which opens and closes the release tube 1210. In general, control circuitry 1214 may be used for control of electrical components of system 1200 and receive electrical power from a suitable power source. In some implementations, control circuitry 1214 may control the amount of flow of solubilized riboflavin 1208 according to a predetermined flow setting value (or, e.g., a predetermined range of flow setting values). In some implementations, control circuitry 1214 may control the amount of flow of solubilized riboflavin 1208 for release using a continuous-variable setting of valve 1212 and/or using a variable frequency setting to open and close the valve 1212 in a pulsed on/off manner. In some implementations, a sensor 1226 may be disposed in first tank 1202 for a regular or real-time sensing and monitoring of a ratio or percentage of riboflavin to water. Control circuitry 1214 may determine the ratio or percentage of riboflavin to water based on signals from sensor 1226 and control the setting of valve 1212 according to the predetermined flow setting value or predetermined range of flow setting values. As one illustrative example, for a water purification system, one may inject riboflavin solubilized in water at ambient or room temperature (e.g., 10-13 mg of riboflavin per 100 mL of water intended to sterilize).

Control circuitry 1214 may operate a set of UV-C LEDs 1220 in first tank 1202 to produce UV-C light which is emitted on the liquid 1204 that carries the riboflavin (e.g., a UV-C LED 1222 emits a UV-C light 1224 on the liquid). The emission of the UV-C light from the set of UV-C LEDs 1220 is sufficient to activate the riboflavin that is carried in the liquid 1204 to enhance a cross-linking of genetic material of cells or pathogens or extracellular genetic material within the liquid 1204. This process may provide for sterilization of the genetic material of the cells or the pathogens or the extracellular genetic material in liquid 1204. The liquid which is processed in this manner may then be discharged or released through an outlet tube 1228 from first tank 1202. In some implementations, if the liquid 1204 is water, it may be provided as safe drinking water 1232 from a faucet 1232 or other dispensing means that is connected to outlet tube 1228 for human consumption or other. In other implementations, the liquid 1204 may be packaged in a packaging for distribution and/or sale. In yet other implementations, the liquid 1204 may be a liquid 1250 which comprises a liquid pharmaceutical or an intravenous fluid which is appropriately packaged, also described later in relation to FIG. 14.

In some implementations, system 1200 further includes a generator 1216 which may be controlled by control circuitry 1214 to produce high-frequency sound or vibrational waves 1218 (e.g., ultrasonic waves) through the liquid 1204 that carries the riboflavin in first tank 1204. The production of these high-frequency sound or vibration waves 1218 are sufficient to disrupt barriers of cells or pathogens, for increased access of the riboflavin and the UV-C to the genetic material of the cells or the pathogens for increased sterilization. In other implementations, control circuitry 1214 may operate generator 1216 to exert and maintain an increased pressure on the liquid 1204 that carries the riboflavin in first tank 1202 (e.g., where first tank 1202 is part of a pressure chamber), sufficient to disrupt barriers of the cells or the pathogens for increased access of the riboflavin and the UV-C to the genetic material of the cells or the pathogens for increased sterilization. In some implementations, heating the solution of water and solubilized riboflavin in first tank 1202 is sufficient to disrupt barriers of the cells or the pathogens, for increased access of the riboflavin and the UV-C to the genetic material of the cells or the pathogens for increased sterilization.

FIG. 13 is an illustrative representation of an example of a system 1300 configured for disinfecting a liquid (e.g., water or other) according to some implementations of the present disclosure. System 1300 of FIG. 13 may be substantially the same as system 600 of FIG. 6 with respect to the production of the flow of liquid that carries the riboflavin, and with respect to the sterilization of the liquid (e.g., operating in the same or similar manner), however it is without need to produce the mist. The liquid which is processed as previously described is merely discharged or released through outlet tube 626. In some implementations, if the liquid is water, it may be provided as safe drinking water 1232 from faucet 1230 or other dispensing means that is connected to outlet tube 626 for human consumption or other. In other implementations, the liquid may be packaged in a packaging for distribution and/or sale. In yet other implementations, the liquid may be the liquid 1250 which comprises the liquid pharmaceutical or the intravenous fluid which is appropriately packaged, also described later in relation to FIG. 14.

Figure 14:
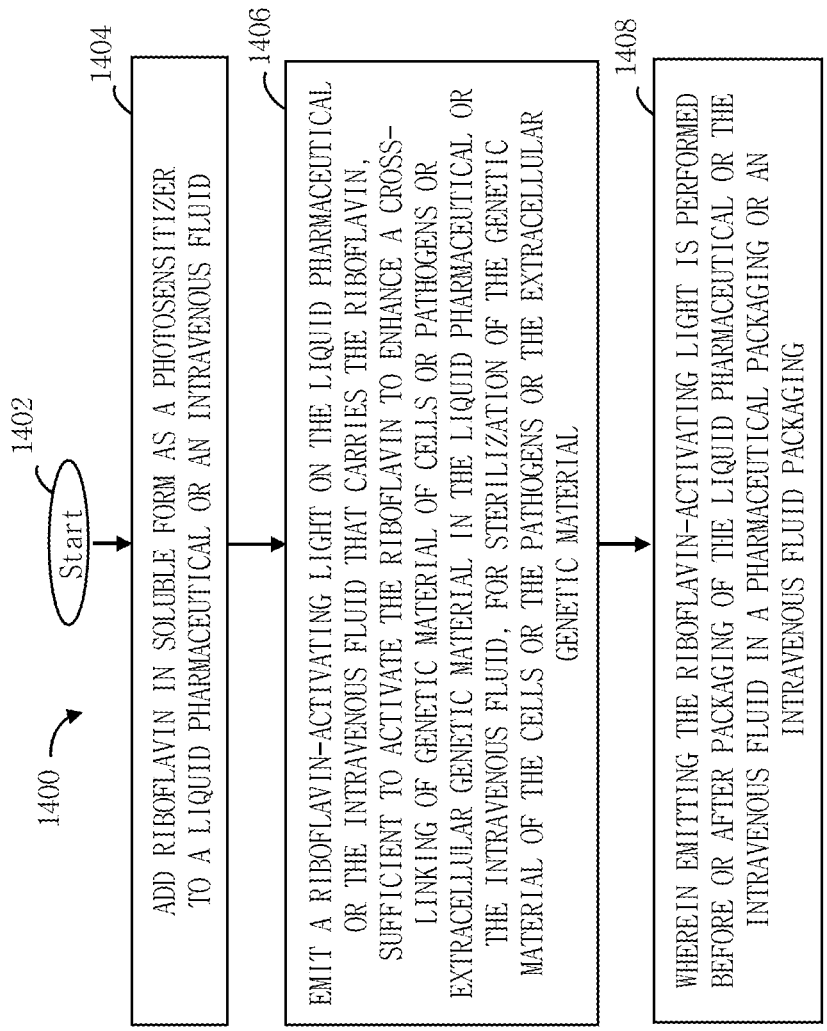
FIG. 14 is a flowchart for describing a method for use in disinfecting a liquid pharmaceutical or an intravenous fluid according to some implementations.

FIG. 14 is a flowchart 1400 for describing a method for use in disinfecting a liquid pharmaceutical or an intravenous fluid according to some implementations of the present disclosure. The liquid pharmaceutical or the intravenous fluid may be carried, for example, in a holding container, a holding chamber, or a holding tank, or through a channel, a tube, or a pipe, etc. Beginning at a start block 1402 of FIG.

14, riboflavin as a photosensitizer may be added in the liquid pharmaceutical or the intravenous fluid (step 1404 of FIG. 14). Here, the riboflavin may be added in the liquid pharmaceutical or the intravenous fluid in raw or soluble form, and adequately mixed therewith to create a homogenous solution. In some implementations, when the liquid pharmaceutical or the intravenous fluid is provided in a flow during manufacturing or processing, adding the riboflavin to the flow may involve regularly or continuously injecting the riboflavin in soluble form into regularly or continuously replenished liquid pharmaceutical or the intravenous fluid. A riboflavin-activating light may be emitted on the liquid pharmaceutical or the intravenous fluid that carries the riboflavin (step 1406 of FIG. 14). The emission of the riboflavin-activating light may be sufficient to activate the riboflavin to enhance a cross-linking of genetic material of cells or pathogens or extracellular genetic material in the liquid pharmaceutical or the intravenous fluid, for sterilization of the genetic material of the cells or the pathogens or the extracellular genetic material in the liquid pharmaceutical or the intravenous fluid. In some implementations, the riboflavin-activating light may be UV-C which may be emitted from one or more UV-C LEDs.

The liquid pharmaceutical may be packaged in a liquid pharmaceutical packaging, whereas the intravenous fluid may be packaged in an intravenous fluid packaging. The emission of the riboflavin-activating light in step 1406 of FIG. 14 may be performed before or after the packaging of the liquid pharmaceutical or the intravenous fluid (step 1408 of FIG. 14). In some implementations, the emission of the riboflavin-activating light may be performed before the packaging of the liquid pharmaceutical or the intravenous fluid in the packaging. In other implementations, the emission of the riboflavin-activating light may be performed after the packaging of the liquid pharmaceutical or the intravenous fluid in the packaging.

In some implementations, high-frequency sound or vibrational waves (e.g., ultrasonic waves) may be generated in the liquid pharmaceutical or the intravenous fluid that carries the riboflavin, sufficient to disrupt barriers of the cells or the pathogens in the liquid, for increased access of the riboflavin and the UV-C to the genetic material of the cells or the pathogens for increased sterilization. In other implementations, an increased pressure may be exerted and maintained on the liquid pharmaceutical or the intravenous fluid that carries the riboflavin, sufficient to disrupt barriers of the cells or the pathogens in the liquid pharmaceutical or the intravenous fluid, for increased access of the riboflavin to the genetic material of the cells or the pathogens for increased sterilization. In some implementations, the liquid pharmaceutical or the intravenous fluid that carries the riboflavin may be heated sufficiently to disrupt barriers of the cells or the pathogens in the liquid pharmaceutical or the intravenous fluid, for increased access of the riboflavin to the genetic material of the cells or the pathogens for increased sterilization.

Figure 15:
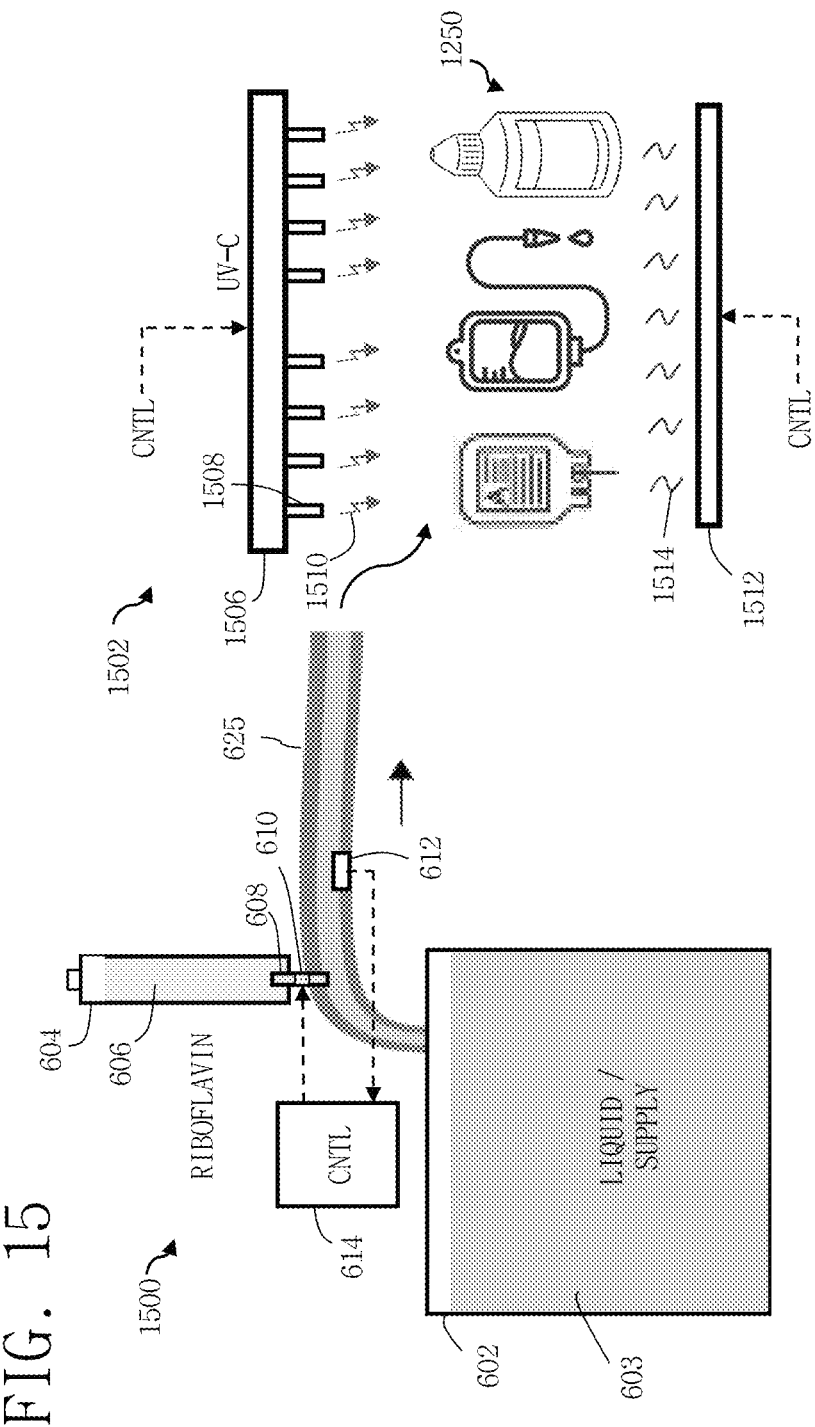
FIG. 15 is an illustrative representation of an example of a system or apparatus which may apply the methods described above in relation to FIG. 14.

FIG. 15, as well as previous FIGS. 12-13, are illustrative representations of different examples of various systems and apparatus which may apply the methods described above in relation to FIG. 14. Although a number of different examples are shown and described in relation to these figures, the methods are not limited to the same and may include additional or alternative features, details, variations, etc. as described elsewhere herein (in relation to the other figures or outside of the figures), or may alternatively be embodied in other systems and apparatus.

Thus, system 1200 of FIG. 12 and system 1300 of FIG. 13 may be used for disinfecting a liquid pharmaceutical or an intravenous fluid according to the method of FIG. 11, as previously described in relation to FIGS. 12 and 13. Such approaches provide for UV-C sterilization of the liquid before the packaging of the liquid. In other implementations, UV-C sterilization may be performed after the packaging of the liquid pharmaceutical or the intravenous fluid.

To that end, FIG. 15 is an illustrative representation of an example of a system 1500 configured for disinfecting a liquid (e.g., a liquid pharmaceutical, an intravenous fluid, or water or other beverage, etc.) according to some implementations of the present disclosure. System 1500 of FIG. 15 may be substantially the same as system 1300 of FIG. 13 with respect to the production of the flow of liquid that carries the riboflavin (e.g., operating in the same or similar manner), however the sterilization chamber of FIG. 13 is omitted and the components of the sterilization chamber are instead provided in a processing area 1502 (e.g., such as a room or a chamber) for UV-C sterilization.

In the system 1500 of FIG. 15, the liquid may first be discharged or released via outlet tube 625 into a suitable packaging (e.g., liquid 1250 which is disposed in a liquid pharmaceutical packaging or an intravenous fluid packaging; or alternatively, water or other beverage in a bottle packaging; etc.). The packaged liquid may be transported to the processing area 802. Control circuitry 614 may operate a set of UV-C LEDs 1506 that are equipped (e.g., on a ceiling) in the processing area 802 to produce UV-C light which is emitted on the packaged liquid that carries the riboflavin (e.g., a UV-C LED 1508 emits a UV-C light 1510 on the packaging). The emission of the UV-C light from the set of UV-C LEDs 1506 is sufficient to activate the riboflavin that is carried in the packaged liquid to enhance a cross-linking of genetic material of cells or pathogens or extracellular genetic material in the liquid. This process may provide for sterilization of the genetic material of the cells or the pathogens or the extracellular genetic material in the packaged liquid. If the liquid is a liquid pharmaceutical or an intravenous fluid, it may now be sterilized and safely used. If the liquid is water or other beverage, it may now be provided as safe drinking water or other beverage for human consumption or other.

In some implementations, processing area 1502 is further equipped with a generator 1512 which may be controlled by control circuitry 614 to produce high-frequency sound or vibrational waves 1514 (e.g., ultrasonic waves) through the packaged liquid that carries the riboflavin in processing area 1502. The production of these high-frequency sound or vibration waves 1514 are sufficient to disrupt barriers of cells or pathogens, for increased access of the riboflavin and the UV-C to the genetic material of the cells or the pathogens for increased sterilization. In other implementations, heating the packaged liquid that carries the riboflavin is sufficient to disrupt barriers of the cells or the pathogens, for increased access of the riboflavin and the UV-C to the genetic material of the cells or the pathogens for increased sterilization.

Note that, for intravenous fluids (e.g., sterile saline, lactated ringers' solution, etc.), other medical-related fluids, or liquid pharmaceuticals, solubilized riboflavin could be directly injected at ambient or room temperature at the desired concentration of riboflavin. In other implementations, the solubilized riboflavin could be injected at a lower temperature and concentration if the fluid/liquid required storage at such a lower temperature to maintain its stability and solubility of riboflavin. The fluid/liquid may then be subject to LED UV-C light or other light, increasing hydrostatic pressure in a pressure chamber, and/or ultrasonic or ultrasonication that would cover the desired surface area and volume. Care should be taken that the process does not disrupt the active and inactive ingredients. In this application, only a fixed amount of riboflavin may be used without ongoing replenishment. Again, there have been no known reported toxicities related to riboflavin, and excess riboflavin is excreted by the kidneys.

With respect to SARS-CoV-2 (COVID-19) and other viruses, a number of UV-based sterilization devices with unknown efficacies against such viruses, together with a lack of safety measures, have caused a concern over whether such UV-based sterilization products are at a stage to be used by amateur users. While obtaining reported UV doses for SARS-CoV-2 (COVID-19) inactivation by extending the exposure time may not be challenging, the development of UV disinfection devices to deliver the required dose consistently and uniformly urges design considerations. LED UV-C light and other light sources by themselves are not always sufficient, nor is the presence of a fixed amount of a photosensitizer such as riboflavin amongst others. Various concerns associated with biofilms, humidity, temperature, and the presence of the virus in water, air, saliva, feces, surfaces, etc., also exist.

The multimodal approach of the present disclosure may be utilized to adequately address these concerns, making use of the most up-to-date methods, in order to achieve effective sterilization. The present methods, systems, and apparatus for sterilizing instruments, air, water, a room, etc., may be effective in destroying COVID-19 based on what is known about the virus and sanitation methods. The present methods, systems, and apparatus, using the appropriate dose of LED UV-C light or other alternative source, with the appropriate quantity of riboflavin (e.g., either aerosolized or steamed), may be used to kill COVID-19 (with or without ultrasonication and/or increasing hydrostatic pressure or barometric pressure).

What is claimed is:

1. A method comprising:
   carrying a liquid or a flow of liquid comprising water;
   adding riboflavin in soluble form as a photosensitizer to the liquid or the flow thereof;
   heating the liquid or the flow thereof into steam that carries the riboflavin and releasing it into air; and
   emitting, on the steam that carries the riboflavin in the air, a riboflavin-activating light sufficient to activate the riboflavin to enhance a cross-linking of genetic material of cells or pathogens or extracellular genetic material in the air, for sterilization of the genetic material of the cells or the pathogens or the extracellular genetic material in the air, for thereby producing sterilized air to release or circulate in a chamber, a container, or a room,
   wherein heating the liquid or the flow thereof into the steam that carries the riboflavin is sufficient to disrupt barriers of the cells or the pathogens in the air for increased access of the riboflavin and the riboflavin-activating light to the genetic material of the cells or the pathogens.

2. The method of claim 1, wherein the riboflavin-activating light comprises ultraviolet light C (UV-C) from one or more UV-C light-emitting diodes (LEDs).

3. The method of claim 1, further comprising:
   repeating steps of the method in an ongoing process for producing the sterilized air to recirculate through the chamber, the container, or the room.

4. The method of claim 1, further comprising:
   prior to releasing or circulating the sterilized air in the chamber, the container, or the room, generating ultrasonic waves through the steam that carries the riboflavin in the air, sufficient to disrupt the barriers of the cells or the pathogens for further increased access of the riboflavin and the riboflavin-activating light to the genetic material of the cells or the pathogens for increased sterilization.

5. The method of claim 1, further comprising:
   prior to releasing or circulating the sterilized air in the chamber, the container, or the room, exerting and maintaining increased pressure on the steam that carries the riboflavin in the air, sufficient to disrupt the barriers of the cells or the pathogens for further increased access of the riboflavin and the riboflavin-activating light to the genetic material of the cells or the pathogens for increased sterilization.

6. The method of claim 1, wherein the increased access of the riboflavin and the riboflavin-activating light to the genetic material of the cells or the pathogens is for increased sterilization.

7. A method comprising:
   carrying a liquid or a flow of liquid comprising water;
   adding riboflavin in soluble form as a photosensitizer to the liquid or the flow thereof;
   heating the liquid or the flow thereof into steam that carries the riboflavin;
   discharging the steam that carries the riboflavin into a chamber, a container, or a room; and
   emitting, on the steam that carries the riboflavin, a riboflavin-activating light sufficient to activate the riboflavin to enhance a cross-linking of genetic material of cells or pathogens or extracellular genetic material in the chamber, the container, or the room, for sterilization of the genetic material of the cells or the pathogens or the extracellular genetic material in the chamber, the container, or the room,
   wherein heating the liquid or the flow thereof into the steam that carries the riboflavin is sufficient to disrupt barriers of the cells or the pathogens or surface films in the chamber, the container, or the room, for increased access of the riboflavin and the riboflavin-activating light to the genetic material of the cells or the pathogens.

8. The method of claim 7, wherein the riboflavin-activating light comprises ultraviolet light C (UV-C) from one or more UV-C light-emitting diodes (LEDs).

9. The method of claim 7, wherein the emitting of the riboflavin-activating light on the steam that carries the riboflavin causes one or more surfaces or objects in the chamber, the container, or the room to be disinfected.

10. The method of claim 7, further comprising:
    generating ultrasonic waves in the chamber, the container, or the room, sufficient to disrupt the barriers of the cells or the pathogens or the surface films in the chamber, the container, or the room, for further increased access of the riboflavin and the riboflavin-activating light to the genetic material of the cells or the pathogens for increased sterilization.

11. The method of claim 7, further comprising:
    exerting and maintaining an increased pressure on the steam that carries the riboflavin, sufficient to disrupt the barriers of the cells or the pathogens or the surface films in the chamber, the container, or the room, for further increased access of the riboflavin and the riboflavin-activating light to the genetic material of the cells or the pathogens for increased sterilization.

12. The method of claim 7, wherein the increased access of the riboflavin and the riboflavin-activating light to the genetic material of the cells or the pathogens is for increased sterilization.

13. The method of claim 7, wherein the adding of the riboflavin in the liquid or the flow thereof comprises:
regularly or continuously injecting the riboflavin in soluble form into regularly or continuously replenished liquid or flow thereof.

14. A method comprising:
carrying a liquid or a flow of liquid comprising water;
adding riboflavin in soluble form as a photosensitizer in the liquid or the flow thereof;
converting the liquid or the flow thereof into mist or steam that carries the riboflavin;
discharging the mist or the steam that carries the riboflavin into a chamber, a container, or a room;
emitting, on the mist or the steam that carries the riboflavin, a riboflavin-activating light sufficient to activate the riboflavin to enhance a cross-linking of genetic material of cells or pathogens or extracellular genetic material in the chamber, the container, or the room, for sterilization of the genetic material of the cells or the pathogens or the extracellular genetic material in the chamber, the container, or the room; and
exerting and maintaining increased pressure on the mist or the steam that carries the riboflavin sufficient to disrupt barriers of the cells or the pathogens or surface films in the chamber, the container, or the room, for increased access of the riboflavin and the riboflavin-activating light to the genetic material of the cells or the pathogens.

15. The method of claim 14, wherein the riboflavin-activating light comprises ultraviolet light C (UV-C) from one or more UV-C light-emitting diodes (LEDs).

16. The method of claim 14, further comprising:
generating ultrasonic waves in the mist or the steam that carries the riboflavin, sufficient to disrupt the barriers of the cells or the pathogens in the liquid, for increased access of the riboflavin and the riboflavin-activating light to the genetic material of the cells or the pathogens for increased sterilization.

17. The method of claim 14, wherein the increased access of the riboflavin and the riboflavin-activating light to the genetic material of the cells or the pathogens is for increased sterilization.

18. The method of claim 14, wherein the converting of the liquid or the flow thereof into the mist or the steam that carries the riboflavin further comprises:
heating the liquid or the flow thereof into the steam that carries the riboflavin.

19. The method of claim 1, wherein the liquid is water.

20. The method of claim 7, wherein the liquid is water.

* * * * *